(12) United States Patent
Okhrimchuk et al.

(10) Patent No.: US 12,321,052 B2
(45) Date of Patent: Jun. 3, 2025

(54) WAVEGUIDE FOR LOW LOSS, HIGH SPEED ELECTRO-OPTICAL MODULATOR

(71) Applicant: Terra Quantum AG, St. Gallen (CH)

(72) Inventors: Andrey Okhrimchuk, St. Gallen (CH); Gordey Lesovik, St. Gallen (CH); Grigory Alagashev, St. Gallen (CH)

(73) Assignee: Terra Quantum AG, St. Gallen (CH)

( * ) Notice: Subject to any disclaimer, the term of this patent is extended or adjusted under 35 U.S.C. 154(b) by 147 days.

(21) Appl. No.: 18/145,244

(22) Filed: Dec. 22, 2022

(65) Prior Publication Data

US 2023/0213793 A1 Jul. 6, 2023

(30) Foreign Application Priority Data

Dec. 30, 2021 (EP) .................................... 21218377

(51) Int. Cl.
*G02F 1/035* (2006.01)
*G02F 1/01* (2006.01)

(52) U.S. Cl.
CPC .............. *G02F 1/035* (2013.01); *G02F 1/011* (2013.01)

(58) Field of Classification Search
CPC ........ G02F 1/035; G02F 1/011; G02F 1/0305; G02F 1/0316; G02B 6/125; G02B 6/107; G02B 6/13; G02B 2006/12088; G02B 2006/12126; G02B 2006/12142; G02B 2006/12166
See application file for complete search history.

(56) References Cited

U.S. PATENT DOCUMENTS 10,509,168 B2 * 12/2019 Grojo ..................... B23K 26/53
2003/0103708 A1 6/2003 Tigran et al.

FOREIGN PATENT DOCUMENTS

| JP | 63-65406 A | 3/1988 |
| JP | 2003-014965 A | 1/2003 |
| JP | 2004-523917 A | 8/2004 |
| JP | 2006-065044 A | 3/2006 |
| JP | 2011-102891 A | 5/2011 |

OTHER PUBLICATIONS

European Patent Office, Extended European Search Report in EP Patent Application No. 21218377.6, 11 pp. (Jun. 22, 2022).

(Continued)

*Primary Examiner* — John Bedtelyon
(74) *Attorney, Agent, or Firm* — Leydig, Voit & Mayer, Ltd.

(57) ABSTRACT

A waveguide device comprises a substrate comprising an electro-optical material; a waveguide formed in the electro-optical material; and a plurality of electrodes formed in a vicinity of the waveguide. The electro-optical material has a first refractive index. The waveguide comprises a plurality of tracks. The tracks comprise a second refractive index smaller than the first refractive index, are parallel to each other with a common direction defining a direction of the waveguide, and form an arrangement in a plane perpendicular to the direction of the waveguide. The arrangement comprises at least 40 equilateral triangles of identical side lengths, wherein all three corners of each of the equilateral triangles each coincide with a different track of the plurality of tracks in the plane perpendicular to the direction of the waveguide.

17 Claims, 18 Drawing Sheets

(56) References Cited

OTHER PUBLICATIONS

Fedotov et al., "Smooth Writing in YAG Single Crystal with Beam Waist of an Elliptical Cross-Section," *Frontiers in Optics/Laser Science*, p. JTh4B.40 (OSA, 2020).

Jia et al., "Monolithic crystalline cladding microstructures for efficient light guiding and beam manipulation in passive and active regimes," *Scientific Reports*, 4(5988): 7 pp. (Aug. 7, 2014).

Lv et al., "Femtosecond Laser Writing of Optical-Lattice-Like Cladding Structures for Three-Dimensional Waveguide Beam Splitters in LiNbO3 Crystal," *Journal of Lightwave Technology*, 34(15): 3587-3591 (Aug. 1, 2016).

Nie et al., "Optical lattice-like cladding waveguides by direct laser writing: fabrication, luminescence, and lasing," *Optics Letters*, 41(10): 2169-2172 (May 15, 2016).

Okhrimchuk,"Chapter 22: Femtosecond Fabrication of Waveguides in Ion-Doped Laser Crystals," *Coherence and Ultrashort Pulse Laser Emission*, 519-542 (Nov. 2010).

Piromjitpong et al., "High-repetition-rate femtosecond-laser inscription of low-loss thermally stable waveguides in lithium niobate," *Applied Physics A*, 125(302): 8 pp. (Apr. 6, 2019).

Japan Patent Office, Office Action in Japanese Patent Application No. 2022- 205109, 12 pp. (Jun. 4, 2024).

\* cited by examiner

WAVEGUIDE FOR LOW LOSS, HIGH SPEED ELECTRO-OPTICAL MODULATOR

CROSS-REFERENCE TO RELATED APPLICATIONS

The present application claims priority to European patent application no. EP21218377.6, filed on Dec. 30, 2021, which is incorporated herein in its entirety by reference.

TECHNICAL FIELD

The present disclosure relates to an optical waveguide device, in particular a depressed cladding waveguide device, and more particularly to an optical waveguide device with electrodes adapted to provide an electro-optical modulator.

BACKGROUND

A low voltage, low insertion-loss electro-optical modulator (EOM) is a key element for high-speed optical switching. Quantitatively, an insertion loss of 3 dB or less is desirable. For a switching of the electro-optical modulator in a GHz frequency rage, a control voltage lower than 20 V is beneficial, since providing larger control voltages at such high frequencies becomes increasingly challenging. To achieve a control voltage of 20 V or less using known opto-electronic materials, an optical path in the electro-optical material of several centimeters and a distance between electrodes of the EOM and the path of light of few decades of micrometers are simultaneously required. These may be achieved using a waveguide architecture for the electro-optical modulator. A planar waveguide manufactured in a $LiNbO_3$ film is a typical main unit in a high-speed modulator. However, such a waveguide possesses a high propagation loss, which typically exceeds 3 dB/cm. A waveguide manufactured in an electro-optical crystal (or crystalline film) with a propagation loss lower than 0.5 dB/cm could provide a key element for optical switching operations in the GHz frequency range.

BRIEF SUMMARY OF THE INVENTION

In view of the technical problems laid out above, there is a need for a waveguide device with a propagation loss below 0.5 dB/cm and a control voltage of at most 20 V to promote fast (>1 GHz) switching. In particular, these operation parameters ought to be achieved in an electro-optical modulator, for example a phase shifter such as a π phase shifter.

In a first aspect, a waveguide device comprises a substrate comprising an electro-optical material; a waveguide formed in the electro-optical material; and a plurality of electrodes formed in a vicinity of the waveguide. The electro-optical material has a first refractive index. The waveguide comprises a plurality of tracks. The tracks comprise a second refractive index smaller than the first refractive index, are parallel to each other with a common direction defining a direction of the waveguide, and form an arrangement in a plane perpendicular to the direction of the waveguide. The arrangement comprises at least 40 equilateral triangles of identical side lengths, wherein all three corners of each of the equilateral triangles each coincide with a different track of the plurality of tracks in the plane perpendicular to the direction of the waveguide.

In the context of the present disclosure, the equilateral triangles may serve as a reference for the arrangement of the tracks, but do not add any physical structure to the waveguide device.

In a second aspect, an electro-optical modulator comprises a waveguide device as described above. In particular, the electro-optical modulator may be a phase shifter, in particular a π phase shifter.

In a third aspect, a method for fabricating a waveguide device comprises providing a substrate comprising an electro-optical material with a first refractive index; and forming a waveguide in the electro-optical material. The forming the waveguide comprises forming a plurality of tracks of the waveguide such that the tracks are parallel to each other with a common direction defining a direction of the waveguide, and such that the tracks comprise an arrangement in a plane perpendicular to the direction of the waveguide. The arrangement comprises at least 40 equilateral triangles of identical side lengths. All three corners of each of the equilateral triangles each coincide with a different track of the plurality of tracks in the plane perpendicular to the direction of the waveguide. The forming of each track of the plurality of tracks comprises focusing a laser beam into the electro-optical material to permanently reduce a refractive index in a focus of the laser beam from the first refractive index to a second refractive index smaller than the first refractive index; and propagating the focus of the laser beam along the direction of the waveguide to form the track with the second refractive index in the electro-optical material.

BRIEF DESCRIPTION OF THE FIGURES

The techniques of the present disclosure and the advantages associated therewith will be best apparent from a description of exemplary embodiments in accordance with the accompanying drawings.

FIG. 8b is a schematic of an electrical field of an electromagnetic wave propagating in the core of the waveguide device of FIG. 8a.

FIG. 9b is a schematic of an electrical field of an electromagnetic wave propagating in the core of the waveguide device of FIG. 9a.

DETAILED DESCRIPTION OF PREFERRED EMBODIMENTS

Figure 1A:
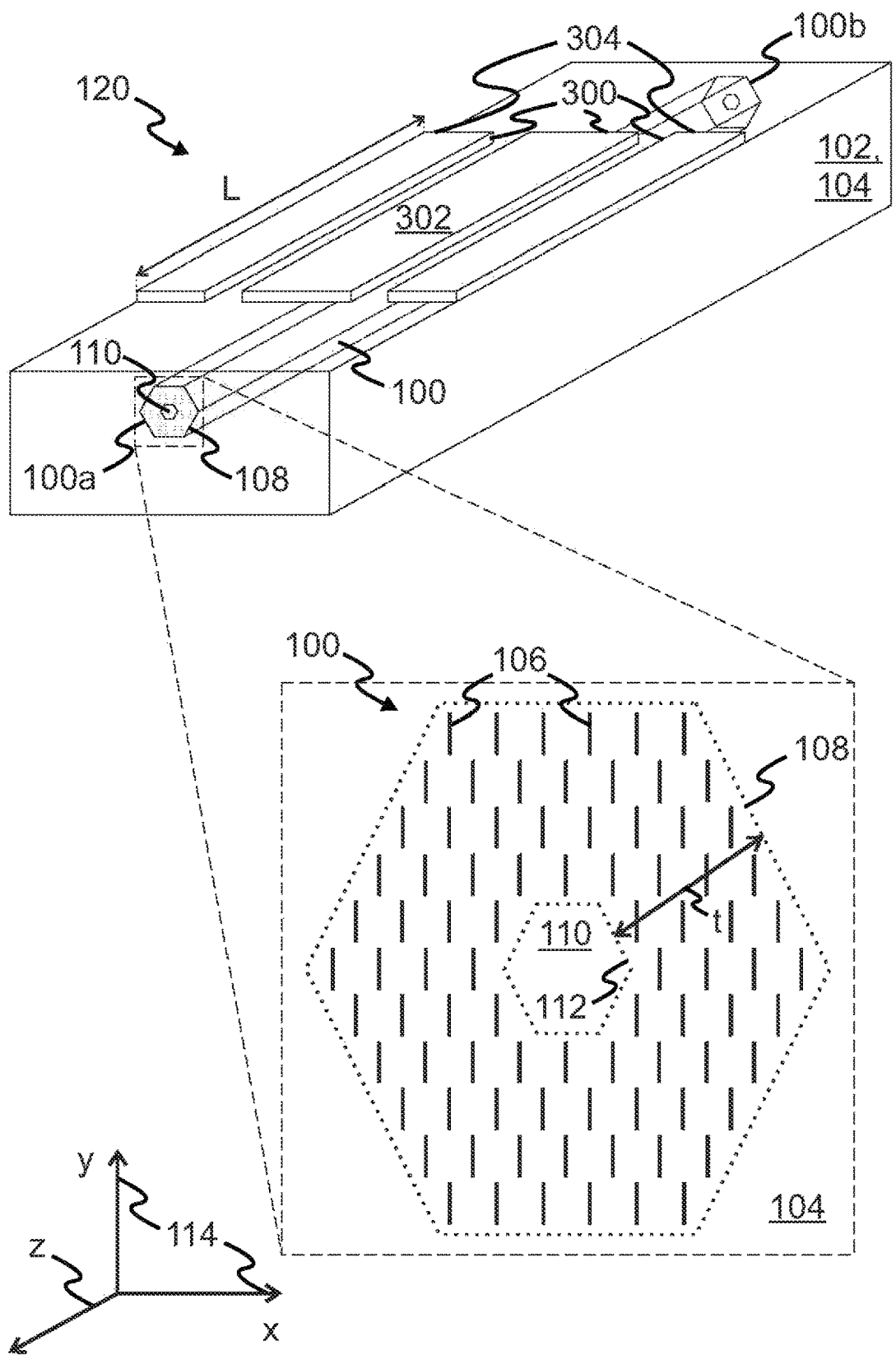
FIG. 1*a* is a schematic of a waveguide with an arrangement of tracks in an electro-optical material in accordance with the disclosure.

FIG. 1a is a schematic illustration of a waveguide device 120. The waveguide device 120 is formed on and in a substrate 102. It comprises a waveguide 100 and a plurality 300 of electrodes 302, 304. The waveguide 100 is formed in an electro-optical material 104, such as Rubidium titanyl phosphate (RTP, RbTiOPO4), contained in the substrate 102.

The substrate 102 may consist entirely of RTP 104, or it may comprise additional structures, for example for optical or plasmonic wave guiding, or to establish electronic functionality. For this purpose, the additional structure may comprise sections composed of a linear dielectric, a semiconductor, and/or metallic structures. Alternatively or in addition to RTP, other electro-optical materials 104 may be applied in the substrate 102, such as potassium titanyl phosphate (KTP, KTiOPO4).

Applying a control voltage between an electrode 302 and counter electrodes 304 of the plurality 300 modulates the refractive index of a core 110 of the waveguide 100 and permits to operate the waveguide device 120 as an electro-optical modulator. The waveguide 100 and the electrodes 302, 304 overlap along a distance L defining a length L of the waveguide device 120. Light may be coupled into and out of the waveguide device 120 by coupling optical fibers (not shown) to the first end 100a and the second end 100b of the waveguide device 120.

The detailed view of FIG. 1a illustrates the cross section of the waveguide 100 of the waveguide device 120 in a plane perpendicular to the waveguide 100. The waveguide 100 may have a similar cross section in any plane perpendicular to the waveguide 100. In particular, the waveguide 100 may have a similar cross section in any plane perpendicular to the waveguide along the length L of the waveguide device 120. The cross section may deviate slightly along the length L of the waveguide device 120, for example, if the waveguide device 120 curves, or if additional structures of the substrate 102 are formed in a vicinity of the waveguide device 120.

The waveguide 100 is formed by an arrangement 108 of tracks 106 in the electro-optical material 104. The tracks 106 contain modified RTP with a lower refractive index than a refractive index of the RTP 104. Their arrangement 108 may be characterized in terms of neighboring tracks 106 that intersect corners of equilateral triangles with identical sizes and orientations. The arrangement 108 and/or the tracks 106 may therefore form a section of a hexagonal lattice, but in some embodiments they deviate from the perfect hexagonal lattice. In the central region 110 of the waveguide, the arrangement 108 of tracks has an interruption 112, where the tracks 116 are absent, and the central region 110 consists of essentially unmodified RTP 104.

As the central region 110 has a higher refractive index than the tracks 106, the waveguide 100 is suitable to confine an electromagnetic wave to the central region 110 in the x-y-plane 114. The central region thus acts as the core 110 of the waveguide 100. The waveguide 100 may be referred to as an embedded cladding waveguide 100. The embedded cladding waveguide 100 guides the electromagnetic wave along a direction z of the waveguide 100 perpendicular to the x-y-plane 114. Along the direction z of the waveguide 100, the waveguide 100 has translational symmetry along its length, and a constant cross sectional structure, possibly apart from minor modifications due to, for example, curving or bending of the waveguide 100.

Embedded cladding waveguides have previously been implemented in materials with garnet-type structures, such as cubic YAG:Nd (propagation loss of 0.7 dB/cm at 1064 nm) and orthorhombic YAP:Nd (propagation loss of 0.52 dB/cm at 1064 nm), as described in Y. Jia, C. Cheng, J. R. Vazquez de Aldana, G. R. Castillo, B. del R. Rabes, Y. Tan, D. Jaque, and F. Chen, "Monolithic crystalline cladding microstructures for efficient light guiding and beam manipulation in passive and active regimes," Sci. Rep. 4, 5988 (2014) and W. Nie, R. He, C. Cheng, U. Rocha, J. Rodriguez Vazquez de Aldana, D. Jaque, and F. Chen, "Optical lattice-like cladding waveguides by direct laser writing: fabrication, luminescence, and lasing," Opt. Lett. 41, 2169-72 (2016). These embedded cladding waveguides provide low propagation losses. However, for a waveguide device such as an electro-optical modulator, a waveguide in an electro-optical material with a significant electro-optical coefficient, and therefore in a crystalline material without inversion symmetry, such as RTP or KTP, is desirable.

Figure 1B:
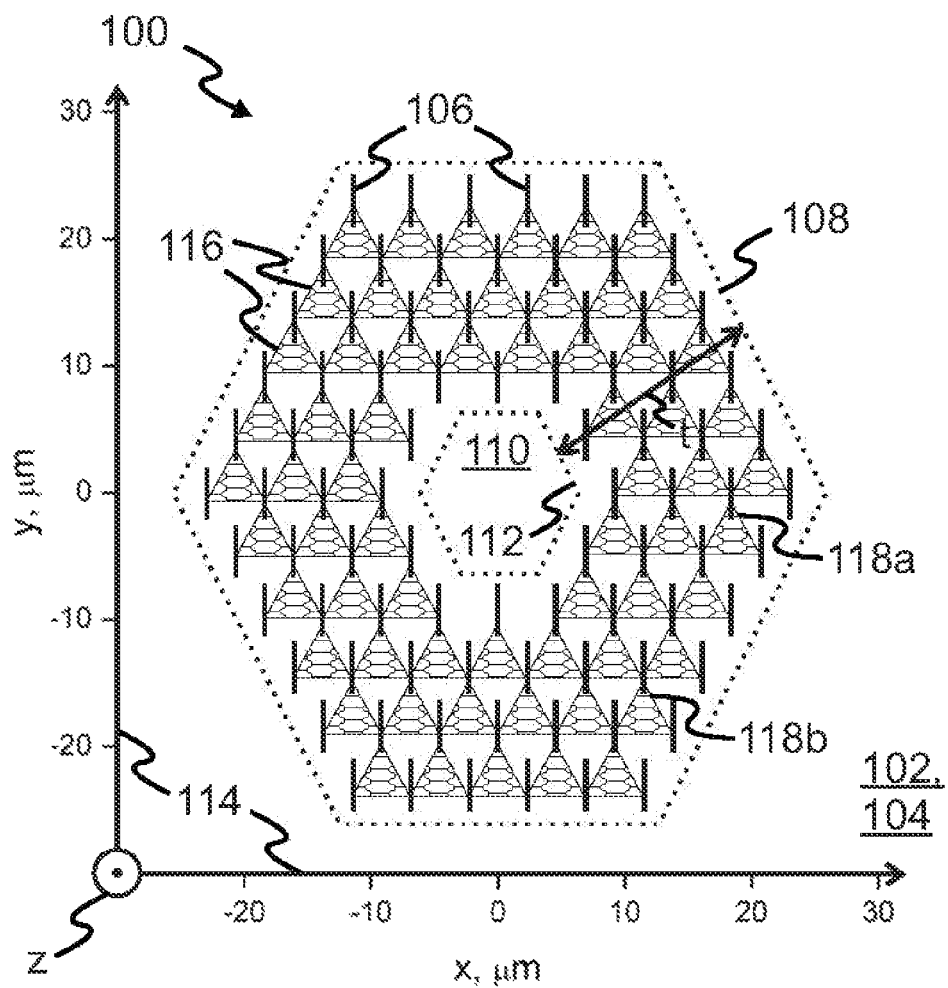
FIG. 1*b* is a schematic of a waveguide with an arrangement of tracks in an electro-optical material similar to the one of FIG. 1*a*.
Figure 1C:
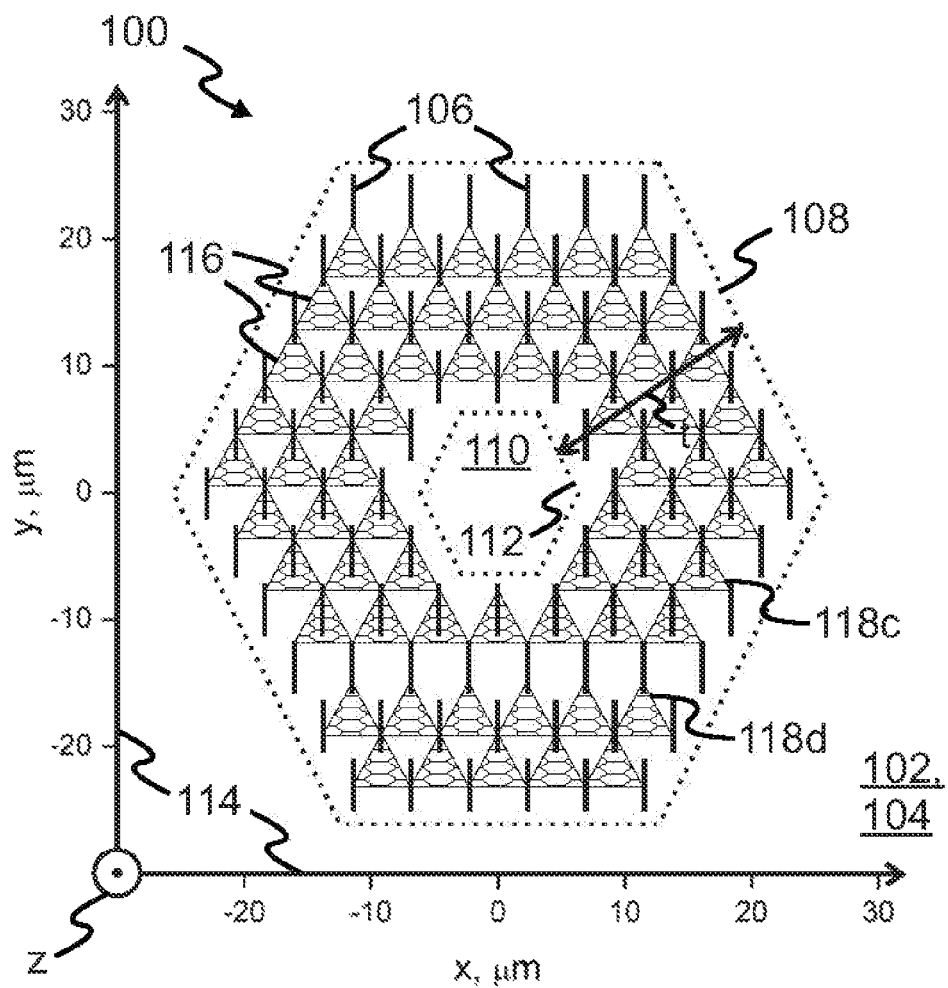
FIG. 1*c* is a schematic of a waveguide with an arrangement of tracks in an electro-optical material similar to the ones of FIG. 1*a* and FIG. 1*b*.

FIG. 1b and FIG. 1c illustrate the arrangement 108 of the tracks 106 in more detail. The arrangement 108 may have a strong influence on the propagation losses of the electromagnetic wave propagating in the core 110 along the direction z of the waveguide. The waveguide 100 according to this description has a minimized propagation loss, which is achieved using the depicted arrangement 108 of tracks 106.

The arrangement 108 may be illustrated with equilateral triangles 116 of identical sizes or side lengths, respectively. These equilateral triangles 116 are introduced for illustration and reference, and do not add any physical structure to the waveguide 100 of FIG. 1a.

Any of the equilateral triangles 116 is constructed in such a way, that each of its corners is located in a cross section of a different track 106 in the x-y-plane 114 perpendicular to the direction z of the waveguide. Any pair of two different equilateral triangles shares at most one cross section of the same track 106. In other words, if a corner of a first equilateral triangle 116 is located in the same cross section of the same track 106 as a corner of a second equilateral triangle 116, the other two corners of the first equilateral triangle 106 are located in cross sections of tracks different from the cross sections of tracks wherein the other two corners of the second equilateral triangle are located.

FIG. 1b and FIG. 1c also illustrate an alternative characterization of the arrangement 108 using lattices 118a, 118b, 118c, 118d of equilateral triangles 106. In contrast to the individual equilateral triangles 116 described above, which may each be identified at arbitrary positions of the arrangement 108 (apart from the restrictions laid out above), the lattices 118a, 118b, 118c, 118d comprise multiple, interrelated equilateral triangles 116.

According to a first definition, any equilateral triangle 116 of the lattice 118a, 118b, 118c, 118d shares at least one corner with a neighboring triangle 116 of the lattice 118a, 118b, 118c, 118d. For example, the lattices 118a, 118b, 118c, 118d comprise 3, 6, 52, and 11 such equilateral triangles 116.

The lattice 118a, 118b, 118c, 118d may alternatively be defined such that any equilateral triangle 116 of the lattice 118a, 118b, 118c, 118d shares at least two corners with neighboring triangles of the lattice 118a, 118b, 118c, 118d. According to this definition, for example, the lattices 118a, 118b, 118c, 118d comprise 1, 4, 52, and 9 equilateral triangles 116.

The lattice 118a, 118b, 118c, 118d may also be defined such that any equilateral triangle 116 of the lattice 118a, 118b, 118c, 118d shares all its corners with neighboring triangles of the lattice 118a, 118b, 118c, 118d. According to this definition, for example, the lattices 118c, 118d comprise 35 and 3 equilateral triangles 116. The sections 118a, 118b of the arrangement 108 of FIG. 1b do not contain any such equilateral triangles 116, and are therefore not lattices according to this definition.

The arrangement 108 with the equilateral triangles 116 corresponds to an at least locally and/or approximately hexagonal arrangement. In other words, the arrangement 108 exhibits a hexagonal symmetry at least locally and/or approximately. In particular, any set of equilateral triangles 116 that may be described as a lattice 118a, 118b, 118c, 118d forms a section of a hexagonal lattice and exhibits an exact, local hexagonal symmetry. Consequently, each of the lattices 118a, 118b, 118c, 118d of equilateral triangles 116 corresponds to a section of a hexagonal lattice and has a local hexagonal symmetry. However, this is not necessarily the case for the tracks 106 corresponding to the lattices 118a, 118b, 118c, 118d. The tracks 106 may have a shape that reduces the symmetry and/or the centers of the tracks 106 may be offset from the corners of the equilateral triangles 116, as long as the corners of the equilateral triangles 116 are located within the cross sections of the tracks 106.

The arrangement 108 with the equilateral triangles 116 optimizes the confinement of an electromagnetic wave propagating along the direction z of the waveguide, and minimizes propagation losses. This is particularly important for the embedded cladding waveguide 100, as the relative difference between the refractive indices of the modified RTP of the tracks 106 and the unmodified RTP 104 is only 0.006-0.009. As the arrangement 118 with the equilateral triangles 116 is at least locally and/or approximately hexagonal, it provides an optimized (approximately closest) packing density of the tracks 106. The arrangement 108 therefore makes best possible use of the limited refractive indices difference for achieving the strongest possible confinement and the lowest possible propagation loss.

FIG. 2a, FIG. 2b, FIG. 2c, FIG. 2d, FIG. 2e, FIG. 2f, FIG. 2g, FIG. 2h, and FIG. 2i illustrate an apparatus and a method for fabricating the waveguide 100. The apparatus comprises a laser system 200 with a laser. The laser setup 200 emits an essentially parallel laser beam 202 at wavelength of 1030 nm with a pulse duration of 180 fs at a repetition rate of 5 kHz, a pulse energy in the range from 250 to 400 nJ and with a diameter of 4.5 mm. The laser beam 202 is focused into the KTP 104 substrate 102 through the surface 208 using a microscope objective 204 with a numerical aperture of 0.65. Under such conditions, the modified RTP for the tracks forms in the focus 206 of the laser beam 202, with a refractive index that is reduced by 0.006-0.009 relative to the refractive index of the unmodified RTP. The extension of the focus 206 along the direction y of the laser beam 202 is in the range from 8-12 μm. Therefore, also the extension along this direction y of the regions of modified RTP and ultimately of the tracks 106 of FIG. 1a, FIG. 1b and FIG. 1c is in the range from 8-12 μm.

Figure 2A:
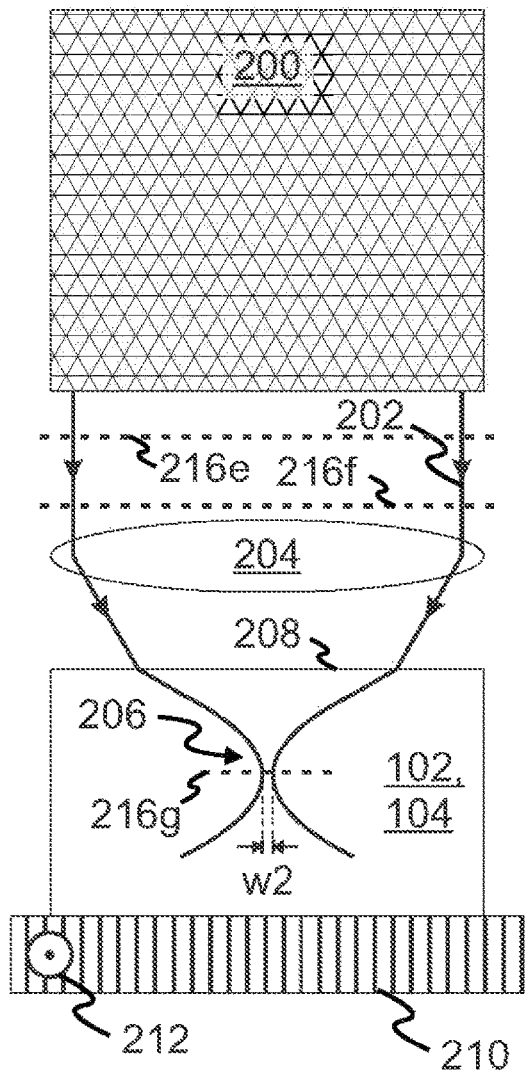
FIG. 2*a* is a diagram of an apparatus for fabricating a waveguide with an arrangement of tracks in an electro-optical material according to an embodiment, viewed along a direction of a translation, in accordance with the disclosure.
Figure 2B:
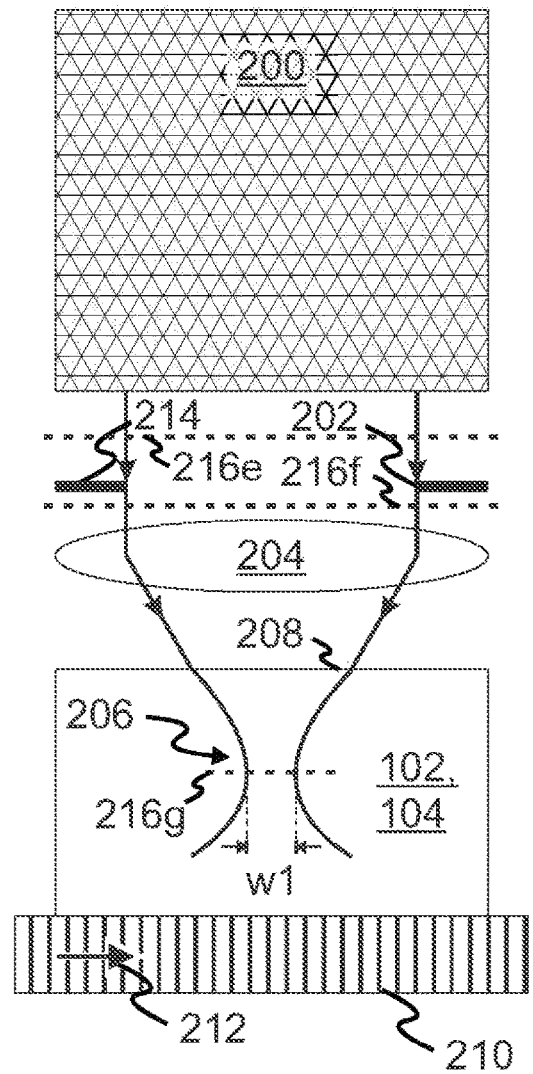
FIG. 2*b* is a diagram of the apparatus for fabricating the waveguide with the arrangement of tracks in the electro-optical material viewed according to the embodiment, from a direction perpendicular to the direction of the translation, in accordance with the disclosure.
Figure 2C:
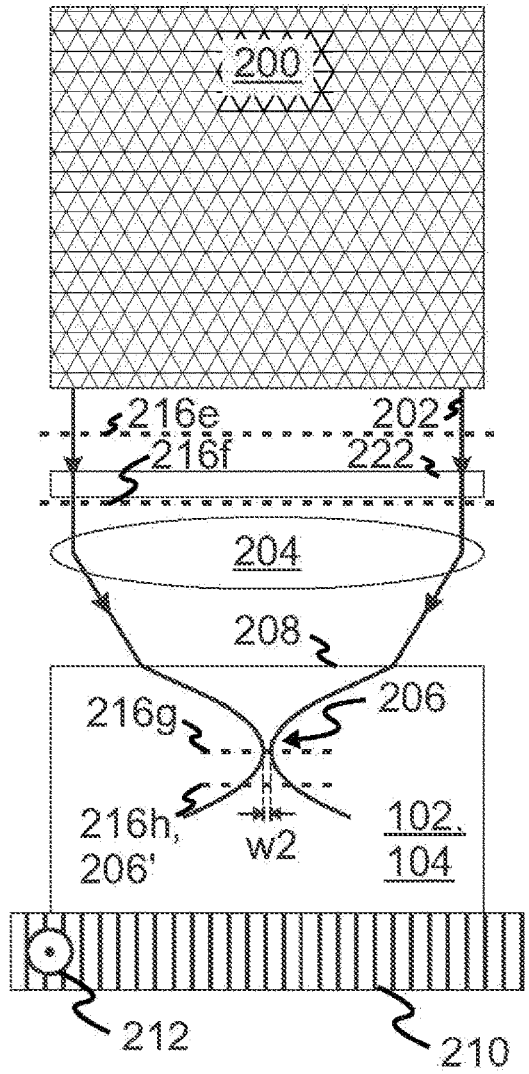
FIG. 2*c* is a diagram of an apparatus for fabricating a waveguide with an arrangement of tracks in an electro-optical material according to another embodiment, viewed along a direction of a translation, in accordance with the disclosure.
Figure 2D:
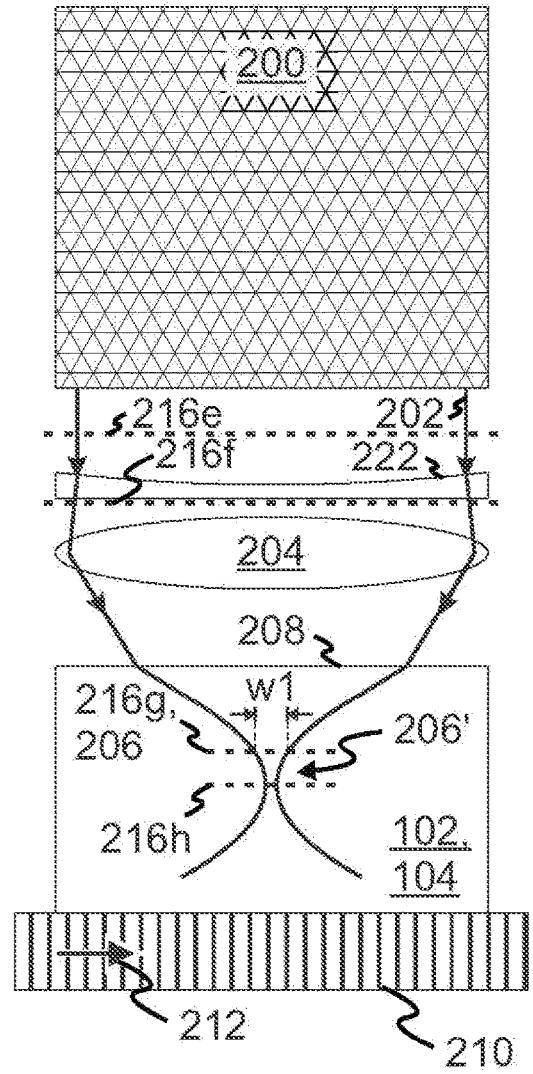
FIG. 2*d* is a diagram of the apparatus for fabricating the waveguide with the arrangement of tracks in the electro-optical material according to the other embodiment of FIG. 2*c*, viewed from a direction perpendicular to the direction of the translation.

The substrate 102 is positioned on a translation stage 210 with a translation direction 212, z for propagating the focus 206 in the electro-optical material 104 to write the tracks 106. FIG. 2a and FIG. 2c show the apparatus viewed along the translation direction 212, z, whereas FIG. 2b and FIG. 2d show the apparatus viewed along a direction perpendicular to the translation direction 212, z. The translation direction 212, z of the translation stage 210 corresponds to the direction z of the waveguide 100 to be produced.

A polarization of the laser beam 202 is perpendicular to the translation direction 212, z, as this geometry has been found to give the strongest reduction of the refractive index of the modified RTP.

As depicted in FIG. 2a and FIG. 2c, along the direction x perpendicular to the direction 212, z of the translation stage 210, the laser beam 202 is focused to a transverse width w2 in the focus 206.

As depicted in FIG. 2b and FIG. 2d, along the direction z parallel to the direction 212, z of the translation stage 210, the laser beam 202 is focused to a longitudinal width w1 in the focus 206. The longitudinal width w1 and the transverse width w2 refer to the widths of the laser beam 202 in the focus 206 along and perpendicular to the direction 212 of the translation stage and of the waveguide, respectively, and are both perpendicular (transverse) to the direction of the laser beam 202. The longitudinal width w1 is larger than the transverse width w2.

As is illustrated in FIG. 2a and FIG. 2b, a spectroscopic slit 214 with a width of 1 mm may be introduced into the essentially parallel laser beam 202 emitted by the laser system 200 to achieve the larger longitudinal width w1. The spectroscopic slit 214 results in a reduced extension of the essentially parallel laser beam 202 along one direction 212, z perpendicular to the direction y of the laser beam 202. Consequently, focusing the laser beam 202 using the microscope objective 204 results in a larger longitudinal width w1 along this direction 212, z.

As an alternative to the spectroscopic slit 214, an anisotropic focusing element 222 such as a cylindrical lens 222 may be introduced into the laser beam, in particular into the essentially parallel laser beam 202, to generate the longitudinal width w1 along the direction 212, z exceeding the transverse width w2 along the perpendicular direction y.

A corresponding embodiment is illustrated in FIG. 2c and FIG. 2d. In such an embodiment, the focus 206 refers to a plane 216g perpendicular to the direction of the laser beam 202, at a position along the direction of the laser beam 202 where the width w2 of the laser beam 202 along the transverse direction (with respect to the translation direction 212, or direction of the waveguide 100, respectively) is minimal. Consequently, in the focus, the laser beam 202 exhibits a beam waist w2 along the transverse direction x. In addition, a second focus 206' forms, corresponding to a plane 216h perpendicular to the direction of the laser beam 202, at a position beam of a waist of the laser beam 202 along the translation direction 212. In the second focus 206', the order of the beam widths is reversed as opposed to the focus 206, i.e., the transverse width of the laser beam 202 exceeds the longitudinal width. A larger longitudinal width in the focus as compared to the transverse width leads to the formation of smoother tracks and a reduced propagation loss of the waveguide formed, and is therefore desirable. Consequently, the focus 206 is used for forming the waveguide rather than the second focus 206'. For details regarding the focusing with an anisotropic focusing element such as a cylindrical lens see, e.g., A. G. Okhrimchuk "Femtosecond Fabrication of Waveguides in Ion-Doped Laser Crystals", DOI: 10.5772/12885, in: "Coherence and Ultrashort Pulse Laser Emission", November 2010.

A writing of tracks into YAG:Nd using a laser beam with an elliptical cross section has previously been demonstrated in S. S. Fedotov and A. G. Okhrimchuk, "Smooth Writing In YAG Single Crystal with Beam Waist of an Elliptical Cross-Section," Frontiers in Optics/Laser Science, p. JTh4B.40 (OSA, 2020). However, the question whether such a technique may be applied to electro-optical materials and/or to produce a triangular arrangement has so far remained elusive.

Figure 2E:
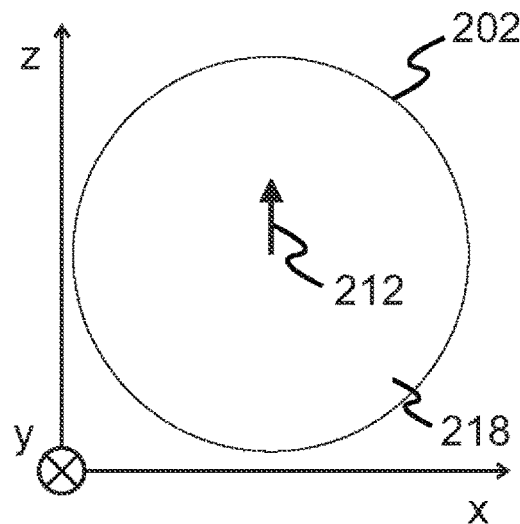
FIG. 2*e* is a cross section diagrammatic view of the apparatus for fabricating the waveguide along a plane 216*e* of FIG. 2*a*, FIG. 2*b*, FIG. 2*c*, and FIG. 2*d*.

FIG. 2e shows a cross section of the apparatus for fabricating the waveguide 100 along the plane 216e of FIG. 2a, FIG. 2b, FIG. 2c and FIG. 2d. In this plane 216e, the laser beam 202 has an essentially circular cross section 218.

Figure 2F:
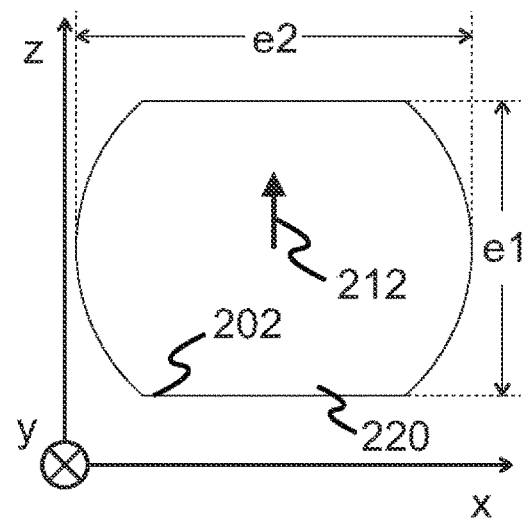
FIG. 2*f* is a cross section through the apparatus for fabricating the waveguide along a plane 216*f* of FIG. 2*a*, FIG. 2*b*, FIG. 2*c* and FIG. 2*d*.

FIG. 2f shows a cross section of the apparatus for fabricating the waveguide 100 along the plane 216f of FIG. 2a, FIG. 2b, FIG. 2c, and FIG. 2d. In this plane 216f, the laser beam 202 has a cross section 220 corresponding to an ellipse. An extension e2 along a direction x perpendicular to the translation direction 212, z exceeds an extension e1 along the translation direction 212, z.

Figure 2G:
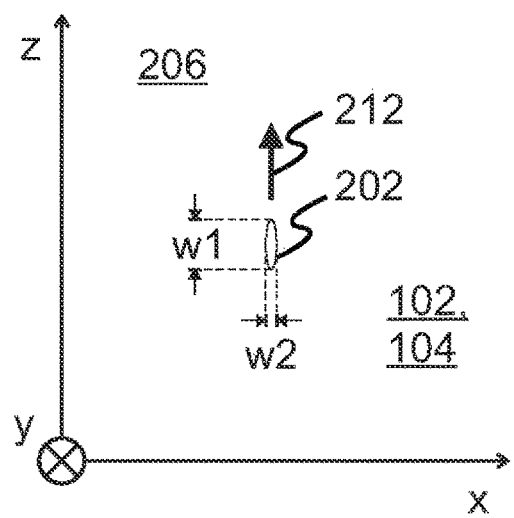
FIG. 2g is a cross section through the apparatus for fabricating the waveguide along a plane 216g of FIG. 2a, FIG. 2b, FIG. 2c, and FIG. 2d.

FIG. 2g shows a cross section of the apparatus for fabricating the waveguide 100 along the plane 216g of FIG. 2a, FIG. 2b, FIG. 2c, and FIG. 2d. This plane 216g corresponds to the focus 206 of the laser beam. In this plane 216g, 206, the laser beam 202 has the longitudinal width w1 along the direction 212, z of the translation stage 210 and the transverse width w2 along the direction x perpendicular to the direction 212, z of the translation stage 210. The longitudinal width w1 along the direction 212, z of the translation stage 210 exceeds the transverse width w2 along the direction x perpendicular to the direction 212, z of the translation stage 210.

Figure 2H:
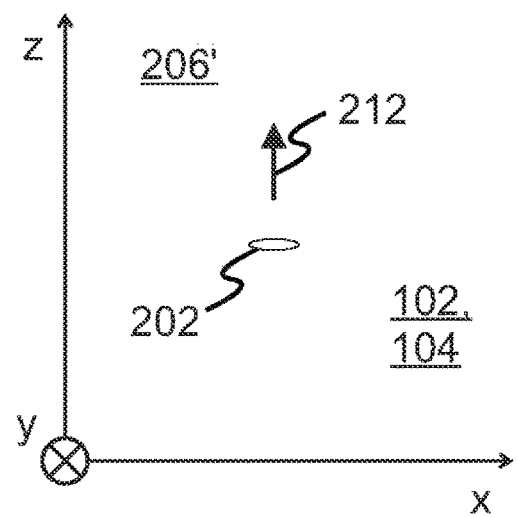
FIG. 2h is a cross section through the apparatus for fabricating the waveguide along a plane 216h of FIG. 2c and FIG. 2d.

FIG. 2h shows a cross section of the apparatus for fabricating the waveguide 100 along the plane 216h of FIG. 2c and FIG. 2d. This plane 216h corresponds to the second focus of the laser beam. In this plane 216h, 206', the laser beam 202 has a longitudinal width along the direction 212, z of the translation stage 210 and a transverse width along the direction x perpendicular to the direction 212, z of the translation stage 210. The longitudinal width along the direction 212, z of the translation stage 210 is smaller than the transverse width along the direction x perpendicular to the direction 212, z of the translation stage 210.

Figure 2I:
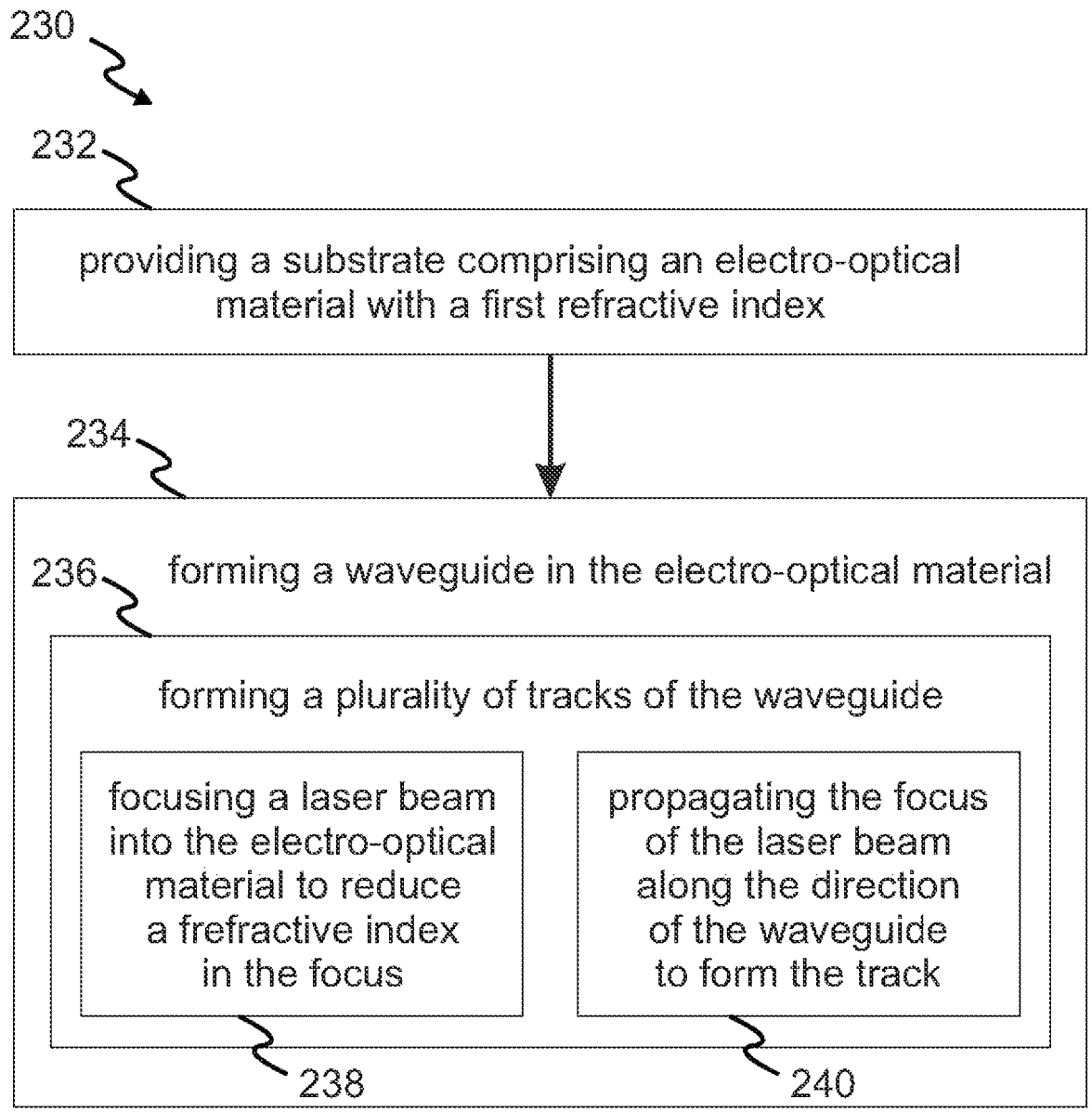
FIG. 2i is a flowchart for a method for fabricating a waveguide according to an embodiment in accordance with the disclosure.

The flow diagram of FIG. 2i summarizes the essential process steps of the method 230 for forming the waveguide device. The method starts with providing 232 the substrate 102 comprising the electro-optical material 104 with the first refractive index, and proceeds with forming 234 the waveguide 100 in the electro-optical material 104. The forming 234 the waveguide 100 comprises forming 236 the plurality of tracks 106 of the waveguide 100. The forming 236 of any of the track 106 comprises focusing 238 the laser beam 202 into the electro-optical material 104 to reduce the refractive index in the focus 206. The forming 236 of any of the tracks 106 further comprises propagating 240 the focus 206 of the laser beam 202 along the direction z of the waveguide 100 to form the track 106.

Figure 3:
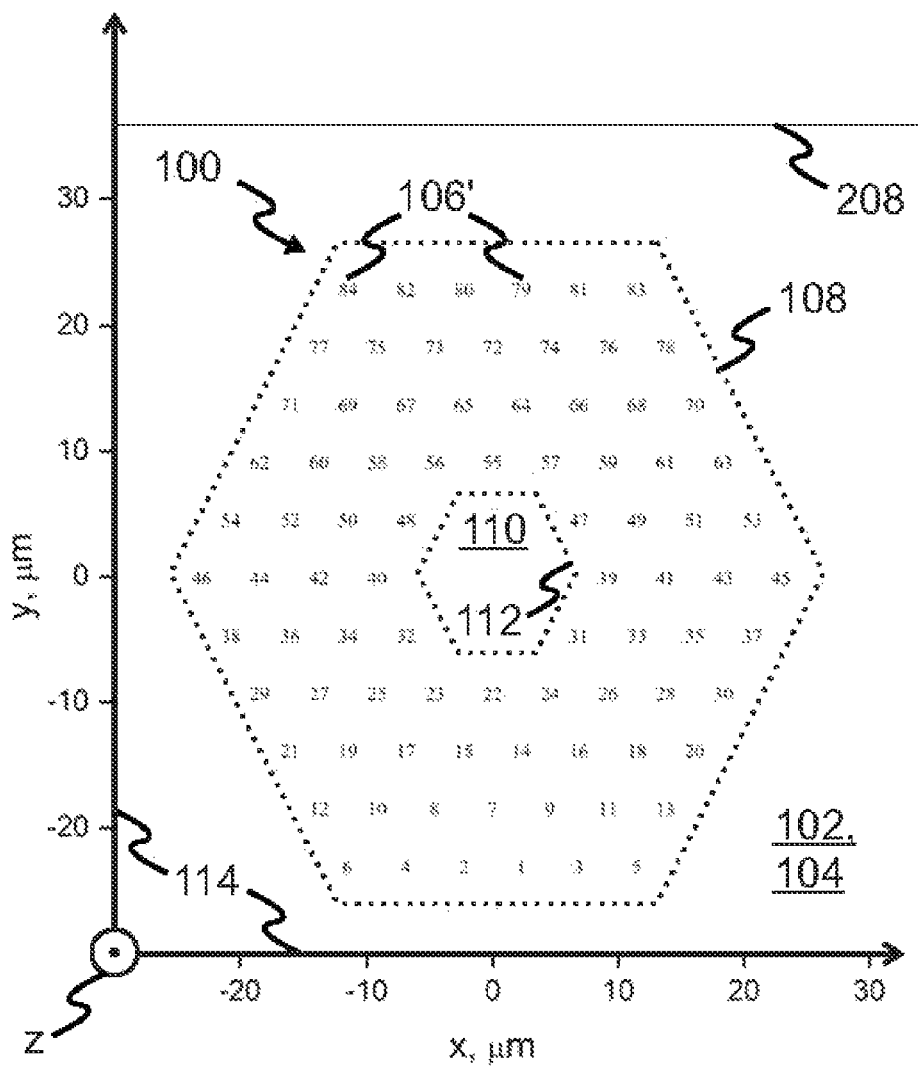
FIG. 3 is flowchart for a method for fabricating a waveguide according to a different embodiment in accordance with the disclosure.

FIG. 3 illustrates a preferred embodiment of the method for fabricating the waveguide. The numbers 106' in FIG. 3 give an order, according to which the tracks 106 are written using the method described in the context of FIG. 2a to FIG. 2i. Tracks with lower numbers 106' are written first, and tracks with higher numbers 106' are written later. Tracks located further away from the surface 208 are written prior to tracks located close to the surface 208. This way, reflections and scattering of the laser beam 202 by tracks 106 already written into the substrate 102 are minimized. When a set of tracks 106, 106' has a same distance from the surface 208, tracks 106, 106' of the set located closer to the center 110 of the waveguide are written first.

Figure 4:
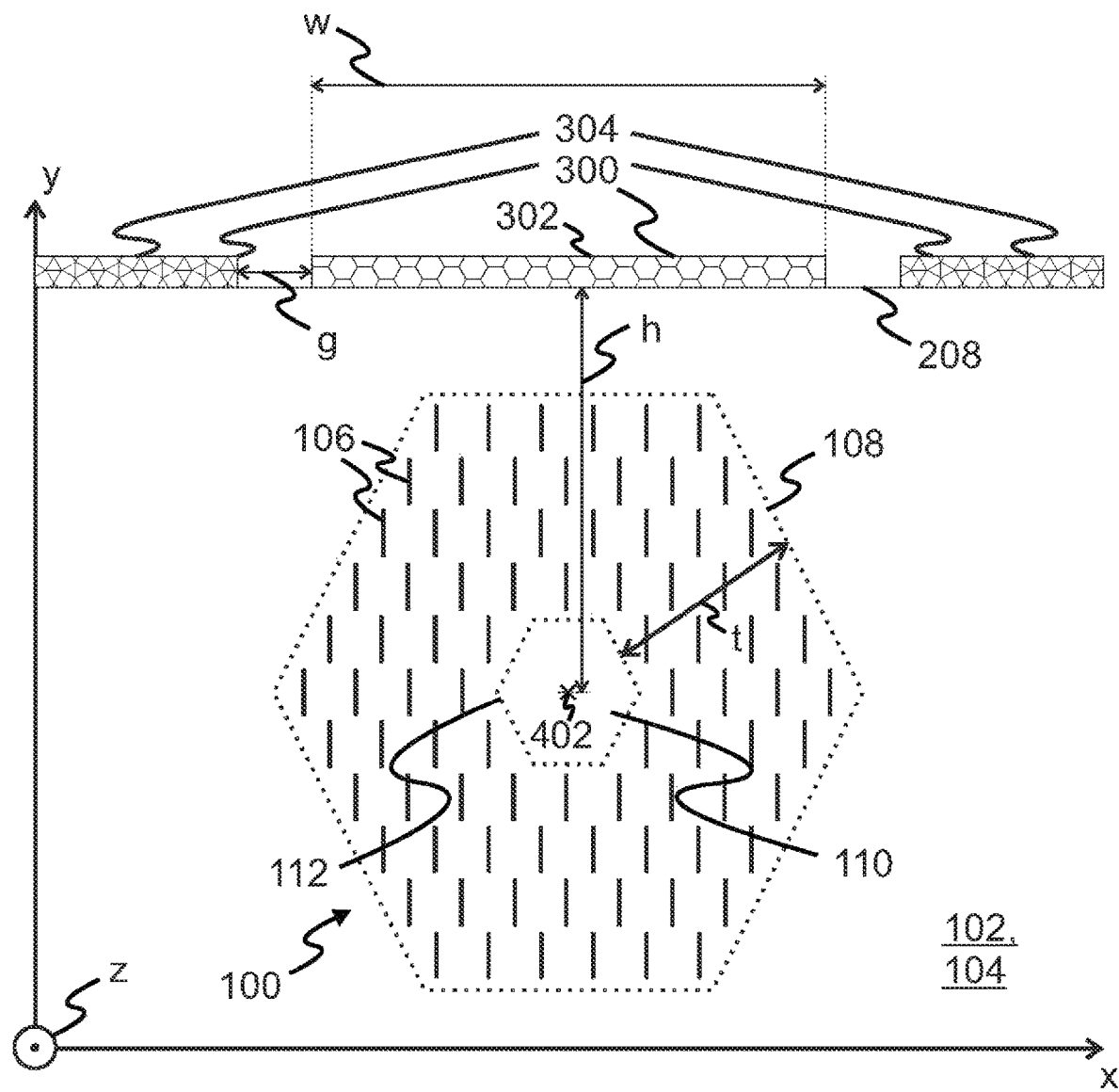
FIG. 4 is a diagram of a waveguide device according to an embodiment of the present disclosure.

FIG. 4 shows a waveguide device with a waveguide 100 in an electro-optical material 104 of a substrate 102. The waveguide 100 may be similar to the one described in the context of FIG. 1a, FIG. 1b, FIG. 1c, FIG. 2a to FIG. 2i and/or FIG. 3. In addition, a plurality 300 of electrodes 302, 304 are formed on a surface 208 of the substrate 102. A distance h separates the center 402 of the core 110 of the waveguide 100 from a nearest electrode 302 with a width w. Two counter electrodes 304 are arranged symmetrically at a distance g in the vicinity of the electrode 302 on the surface 208. Along the direction z of the waveguide 100, the waveguide 100 and the plurality 300 of electrodes 302, 304 have translational symmetry along their respective lengths, and an identical cross section apart from minor modifications due to, for example, curving or bending of the waveguide device.

A control voltage is applied between the electrode 302 and the counter electrodes 304 to operate the waveguide device. Applying the control voltage induces an electric field at the position of the core 110, which modifies the refractive index of the core 110. Consequently, the waveguide device acts as an electro-optical modulator to modulate an electromagnetic wave confined to the core 110 and propagating along the direction z of the waveguide.

The extent of the modulation depends on the magnitude of the electric field at the location of the core 100 induced by applying the control voltage to the electrodes 302, 304. A larger extent of the modulation is desirable, since it allows achieving a preselected modification of the electromagnetic wave, such as a 7C phase shift, using a waveguide device with a shorter length. The shorter length of the waveguide device reduces propagation losses suffered by the electromagnetic wave as it propagates in the waveguide 100 while the preselected modification is carried out.

Generally, providing a waveguide device with a shorter distance h between the core 110 and the nearest electrode 300 enhances the electric field at the location of the core 100 and the extent of the modulation. In the embodiment of FIG. 4, wherein a thickness t of the waveguide 100 formed by the arrangement 108 of tracks 106 is essentially the same in each direction (isotropic), the minimum distance h between the center 402 of the core 110 and the nearest electrode 300 is dictated by the thickness t of the waveguide 100. According to the depicted embodiment, the smallest minimum distance h is given by the sum of the thickness t and a radius of the core 110.

Figure 5A:
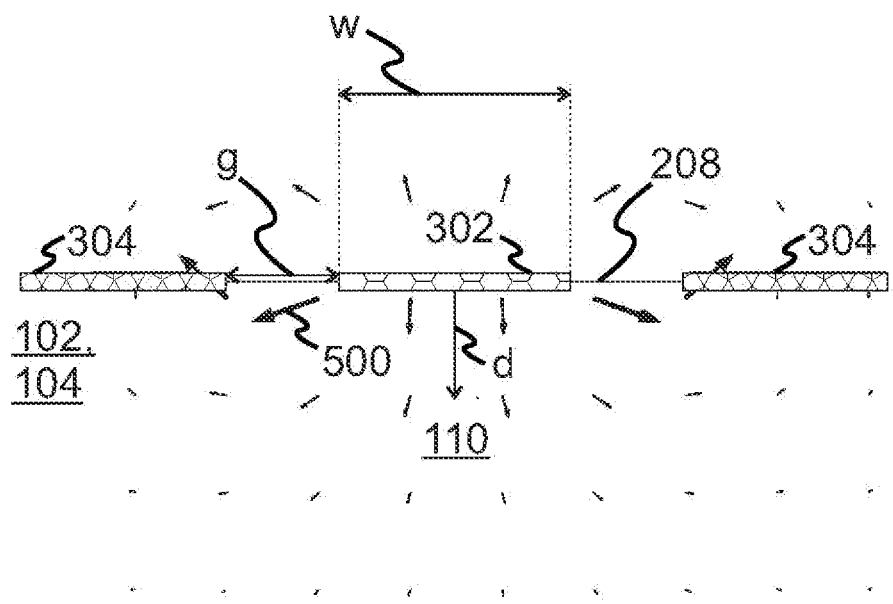
FIG. 5a is a schematic of an electric field induced in a waveguide device by applying a control voltage in accordance with the disclosure.

FIG. 5a illustrates the electric field 500 induced by applying the control voltage between the electrode 302 and the counter electrodes 304. At the position 110 of the core, the electric field 500 is directed approximately perpendicular to the surface 208 and/or to the interface between the electrode 208 and the substrate 102 (or the electro-optical material 104), respectively. The electric field 500 at the position 110 of the core may therefore be characterized by its y-component Ey. The y-component Ey is largest at the interface between the electrode 302 and the substrate 102, and drops with increasing distance d to the electrode 302.

Figure 5B:
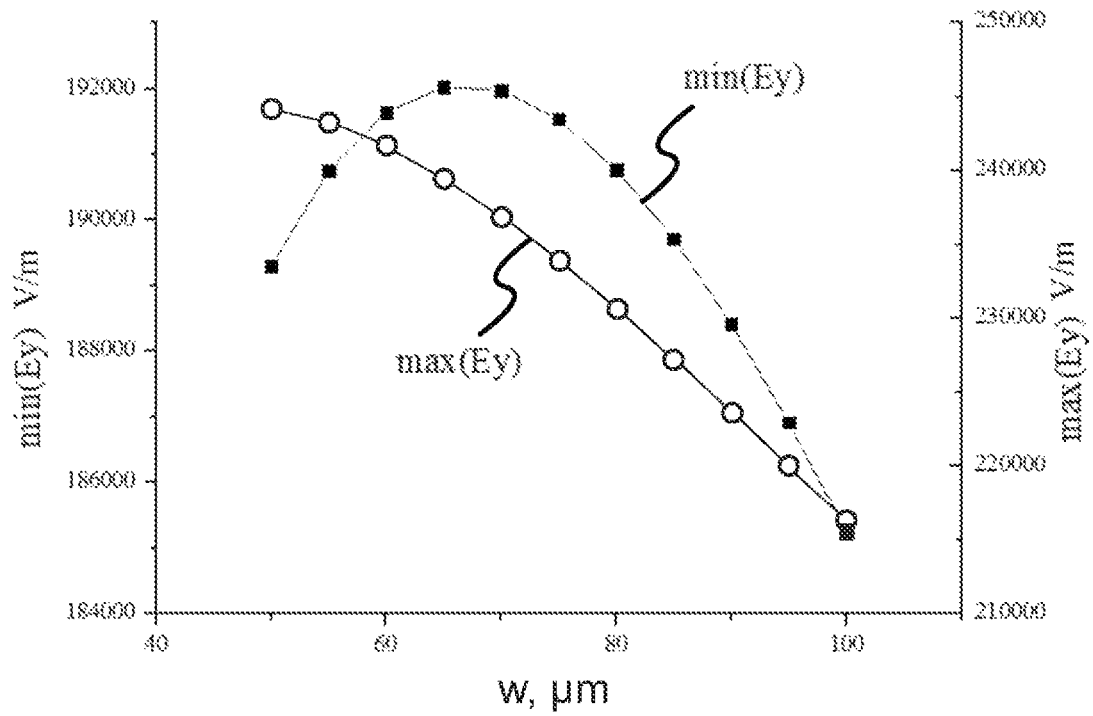
FIG. 5b is a schematic of minimum and maximum electric fields induced in the waveguide device by applying the control voltage in accordance with the disclosure.

FIG. 5b shows the maximum y-component max(Ey) and the minimum y-component min(Ey) of the electric field in the region 110 of the core for different widths w of the electrode 302. A small deviation between the maximum y-component max(Ey) and the minimum y-component min(Ey) is desirable to facilitate a uniform modulation of an electromagnetic wave confined in the core 110. FIG. 5b demonstrates that the deviation is generally small for the waveguide device and may be further minimized using a width w of the electrode 302 of around 60 to 100 µm.

Figure 6:
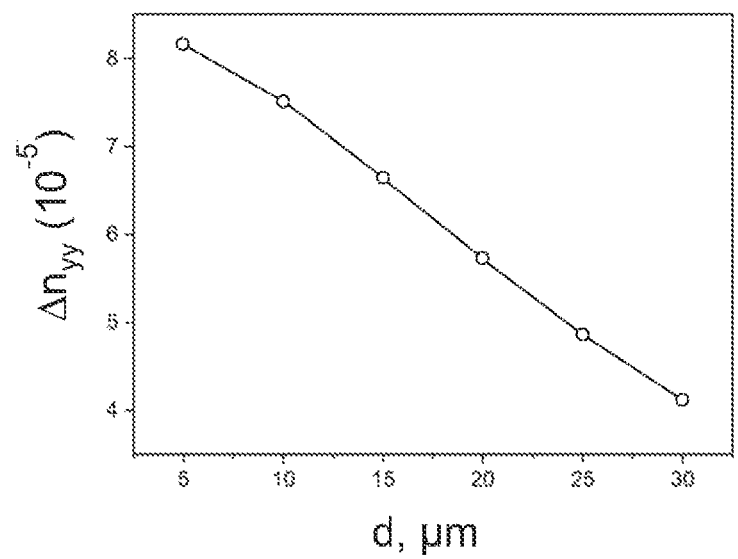
FIG. 6 illustrates a modulation of a refractive index induced in a core of a waveguide device by applying the control voltage in accordance with the disclosure.

FIG. 6 shows the resulting change $\Delta n_{yy}$ of the refractive index for light with a polarization along a direction y perpendicular to the surface 208 achieved by applying a control voltage of 37 V between the electrode 302 and the counter electrodes 304. The change $\Delta n_{yy}$ of the refractive index has been determined for a waveguide device with a width w of the electrode 302 of 50 µm and a distance g between the electrode 302 and the counter electrodes 304 of 10 µm.

Figure 7:
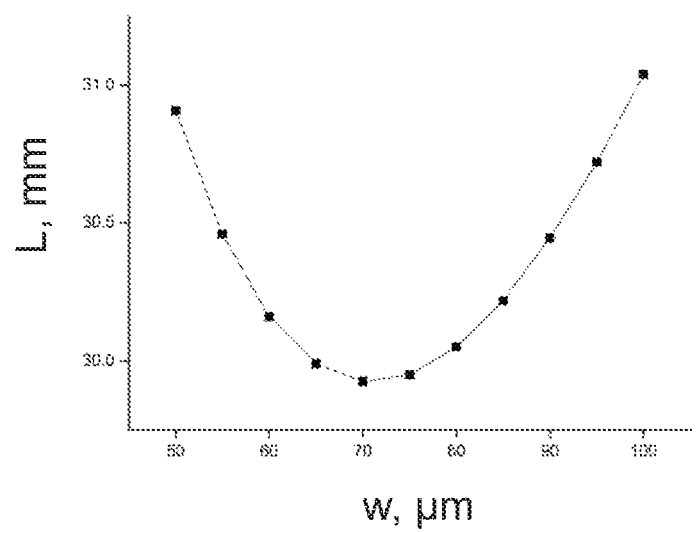
FIG. 7 is a diagram of a length of a waveguide device suitable to operate as a π phase shifter in accordance with the disclosure.

Using the change of the refractive index, a length L of the waveguide device is calculated which is suitable for operating the waveguide device as a π phase shifter. FIG. 7 gives the corresponding length L for different widths w of the electrode 302, while the distance g between the electrode 302 and the counter electrodes 304 amounts to 30 µm and the distance h between the center 402 of the core 110 and the nearest electrode 302 amounts to 50 µm. For an optimized width w of the electrode of approximately 50 to 100 µm, such as 70 µm, a length L of the waveguide device of 30 mm is sufficient to establish a π phase shifter. The short length reduces the optical path length of the propagation of the electromagnetic wave in the core 110 as it undergoes the π phase shift, and therefore minimizes the propagation losses of the electro-optical modulator.

The length L of the waveguide device for the electro-optical modulator, such as the π phase shifter, may be reduced further by increasing the electric field 500 at the location at the core 110, or by increasing the overlap between the electric field 500 and an electromagnetic wave confined in the core, respectively.

Figure 8A:
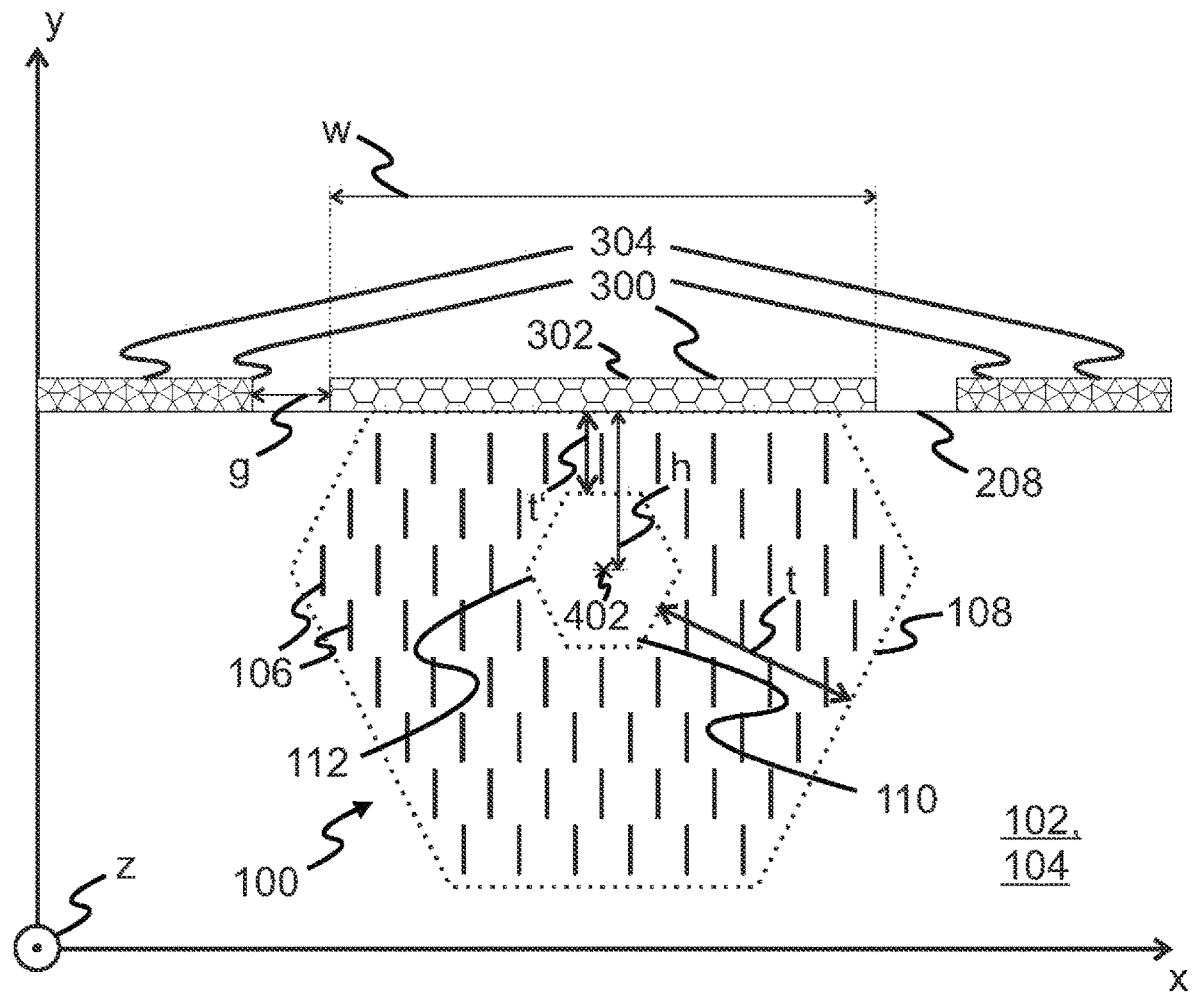
FIG. 8a is a diagram of a waveguide device according to another embodiment in accordance with the disclosure.

FIG. 8a shows an embodiment of the waveguide device with a reduced distance h between the center 402 of the waveguide 100 and the nearest electrode 302. The reduced distance h is achieved by forming the arrangement 108 of the tracks 106 with an anisotropic thickness, i.e. with different thicknesses t, t' along different directions. The thickness t, t' is minimal in the region between the core 110 and the nearest electrode 302. Therefore, the minimum thickness t' of the waveguide 100 dictates the minimum distance h between the center 402 of the core 110 and the nearest electrode 302, rather than an isotropic thickness t as in the embodiment of FIG. 4. The minimum thickness t' of the waveguide 100 is smaller than the isotropic thickness t of the embodiment of FIG. 4. This enhances the electric field induced at the position of the core 110 by applying a control voltage between the electrode 302 and the counter electrodes 304. Consequently, the electro-optical modulator, such as the π phase shifter, may be implemented with a reduced length L and/or a reduced control voltage of the waveguide device. Therefore, a propagation loss of the electro-optical modulator is reduced and/or a switching frequency of the electro-optical modulator is increased. For example, the waveguide device according to the embodiment of FIG. 8a is operable as an electro-optical modulator in the form of a π phase shifter when it is formed with a length of 30 mm and a control voltage of 13.5 V is applied. Thus, the waveguide device according to the embodiment of FIG. 8a provides a low-loss, high-speed electro-optical modulator.

Figure 8B:
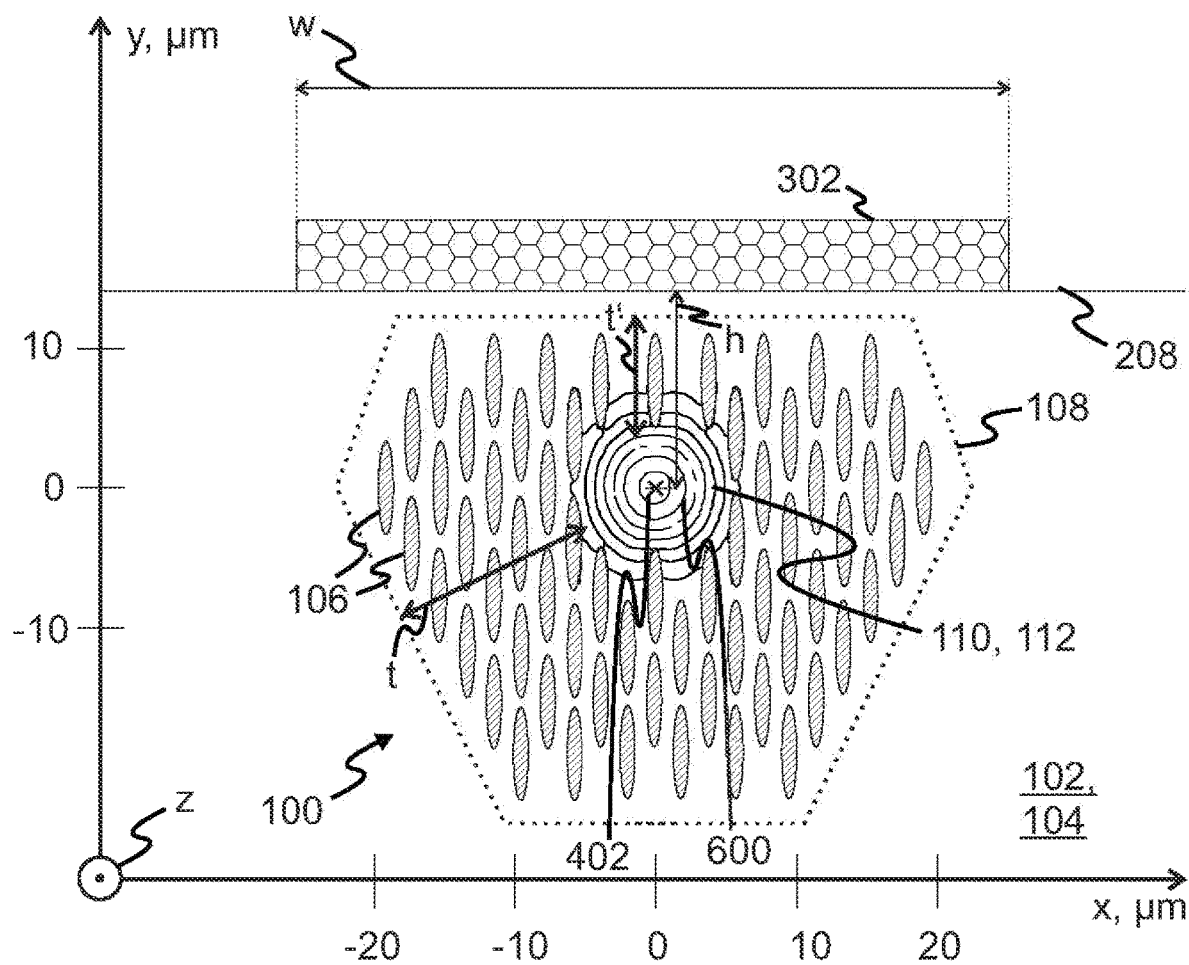

FIG. 8b depicts iso-electrical-field lines 600 of an electromagnetic wave propagating in the waveguide 100, for a waveguide device corresponding to the embodiment of FIG. 8a. In this embodiment, the minimum thickness t' of the arrangement 108 of tracks 106 corresponds to one single track. In this geometry, the iso-electrical-field lines 600 are confined to the core 110, with a negligible overlap with the electrode 302. Consequently, the arrangement 108 of tracks 106 according to the embodiment of FIG. 8a, FIG. 8b provides a functional waveguide with a low propagation loss, while the distance h and the length L are minimized.

Figure 9A:
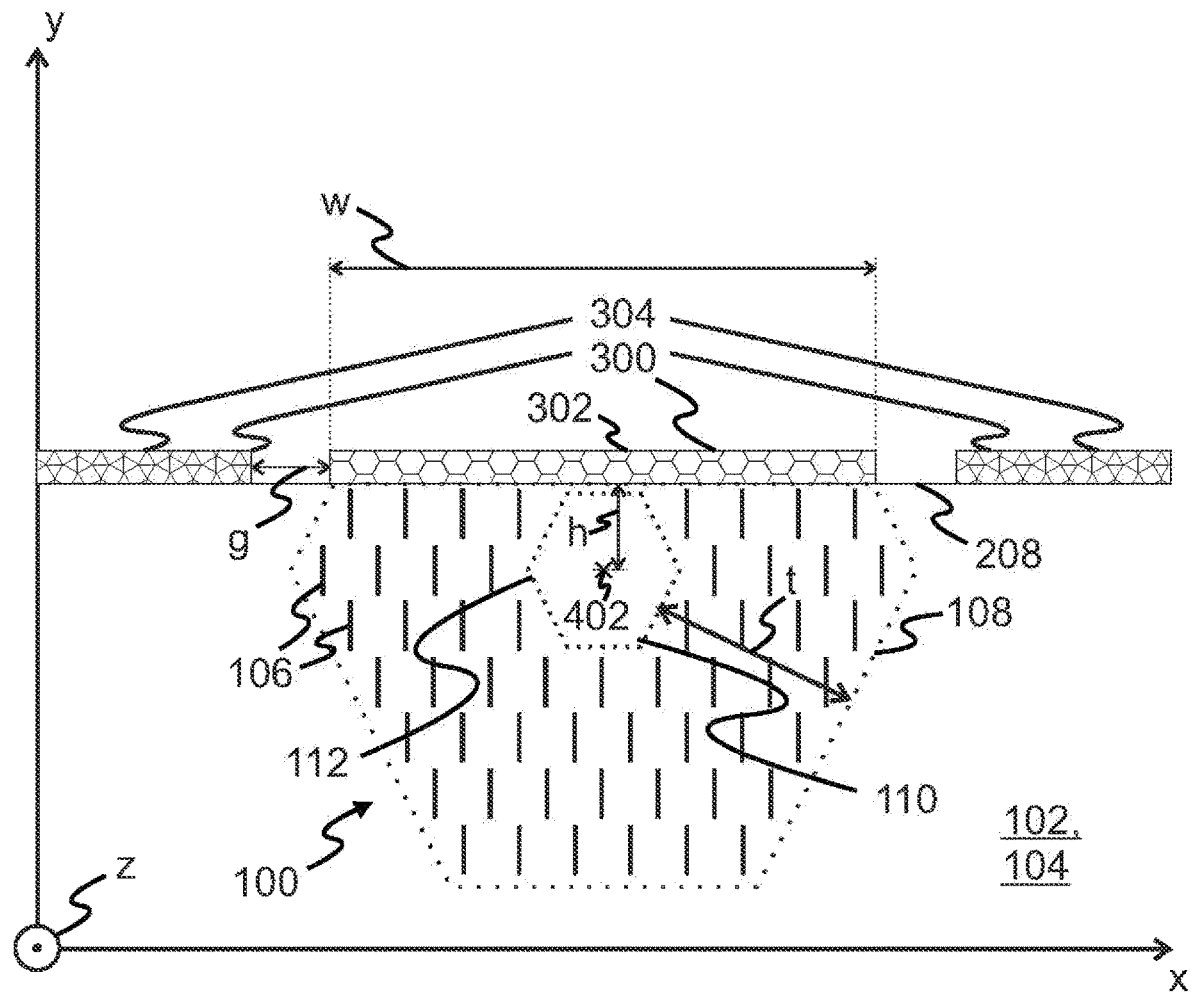
FIG. 9a is a diagram of a waveguide device according to another embodiment in accordance with the disclosure.
Figure 9B:
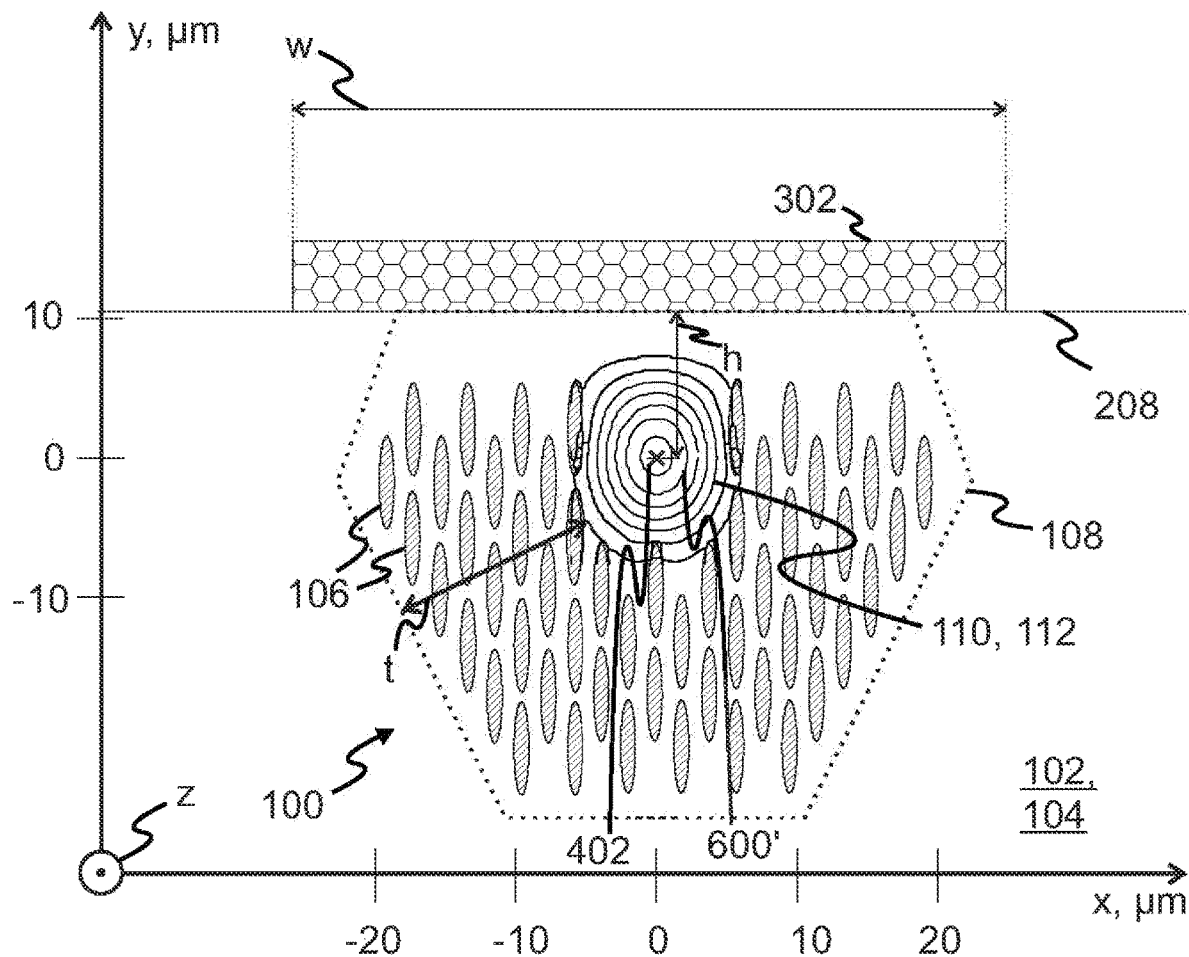

FIG. 9a and FIG. 9b present an embodiment with a further reduction of the minimum thickness t' of the waveguide 100 and consequently of the minimum distance h between the core 110 and the nearest electrode 302. In this embodiment, the minimum thickness t' is essentially zero, with no tracks in the region between the core 110 and the nearest electrode 302. The distance between the center 402 of the core 110 and the electrode 302 is minimized, and corresponds essentially to a radius of the core 402. Therefore, the electric field 500 at the position of the core 110 induced by applying a control voltage between the electrode 302 and the counter electrodes 304 is further enhanced, and a modulation of an electromagnetic wave propagating along the core 110 is enhanced.

However, the absence of tracks 106 in the region between the core 110 and the nearest electrode 302 results in a leakage of the electromagnetic wave from the core 110 to the electrode 302. This is illustrated in FIG. 9b, which depicts iso-electrical-field lines 600 of the electromagnetic wave for such an embodiment. The overlap between the electromagnetic wave and the electrode 302 results in an absorption of the electromagnetic wave in the electrode 302 and an increased propagation loss.

In summary, the embodiment of FIG. 9a and FIG. 9b may provide an enhanced electric field 500 and modulation of the refractive index at the position of the core 110, yet possibly at the cost of a stronger distortion of the electromagnetic field and larger propagation losses.

Figure 10:
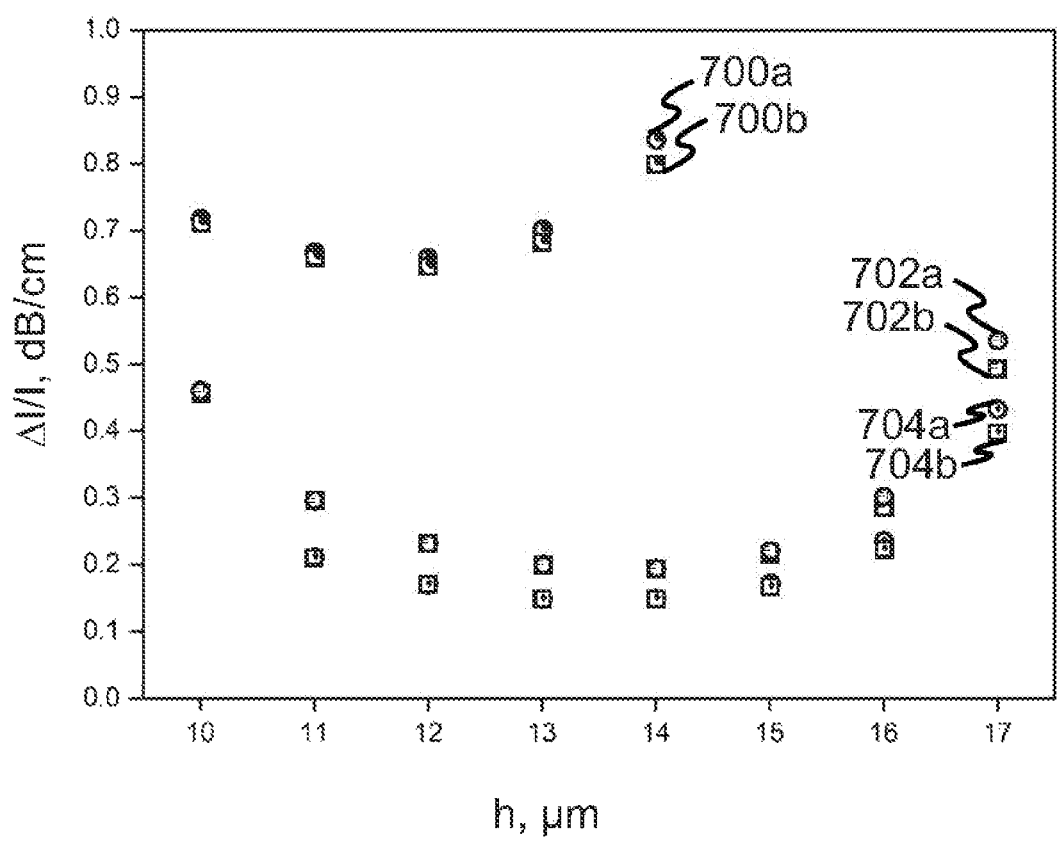
FIG. 10 illustrates propagation losses in waveguide devices in accordance with the disclosure.

The graph of FIG. 10 illustrates the propagation losses 700a, 700b, 702a, 702b, 704a, 704b of waveguide devices with a minimum thickness t' corresponding to one track 116

(embodiment of FIG. 8a, FIG. 8b) and with a minimum thickness t' of essentially zero (embodiment of FIG. 9a, FIG. 9b).

In detail, the individual data sets 700a, 700b, 702a, 702b, 704a, 704 indicate the propagation losses of devices with the following characteristics:

700a: minimum thickness t' of one track 116, copper electrode, control voltage of 37 V;

700b: minimum thickness t' of one track 116, copper electrode, control voltage of 0 V;

702a: minimum thickness t' of one track 116, gold electrode, control voltage of 37 V;

702b: minimum thickness t' of one track 116, gold electrode, control voltage of 0 V;

704a: minimum thickness t' of zero, copper electrode, control voltage of 37 V;

704b: minimum thickness t' of zero, copper electrode, control voltage of 0 V.

FIG. 10 demonstrates that the devices with the minimum thickness t' corresponding to one track 116 (embodiment of FIG. 8a, FIG. 8b) provide propagation losses as low as 0.15 dB/cm (copper electrode) or 0.2 dB/cm (gold electrode) for an optimized distance h between the center 402 of the core and the nearest electrode 302 of 14 μm. A corresponding waveguide device with a length L of 3 cm therefore has a total propagation loss of 0.45 dB (copper electrode) or 0.6 dB (gold electrode). In contrast, for the devices with the minimum thickness t' of essentially zero (embodiment of FIG. 9a, FIG. 9b) propagation losses are around 0.65 dB/cm.

Figure 11:
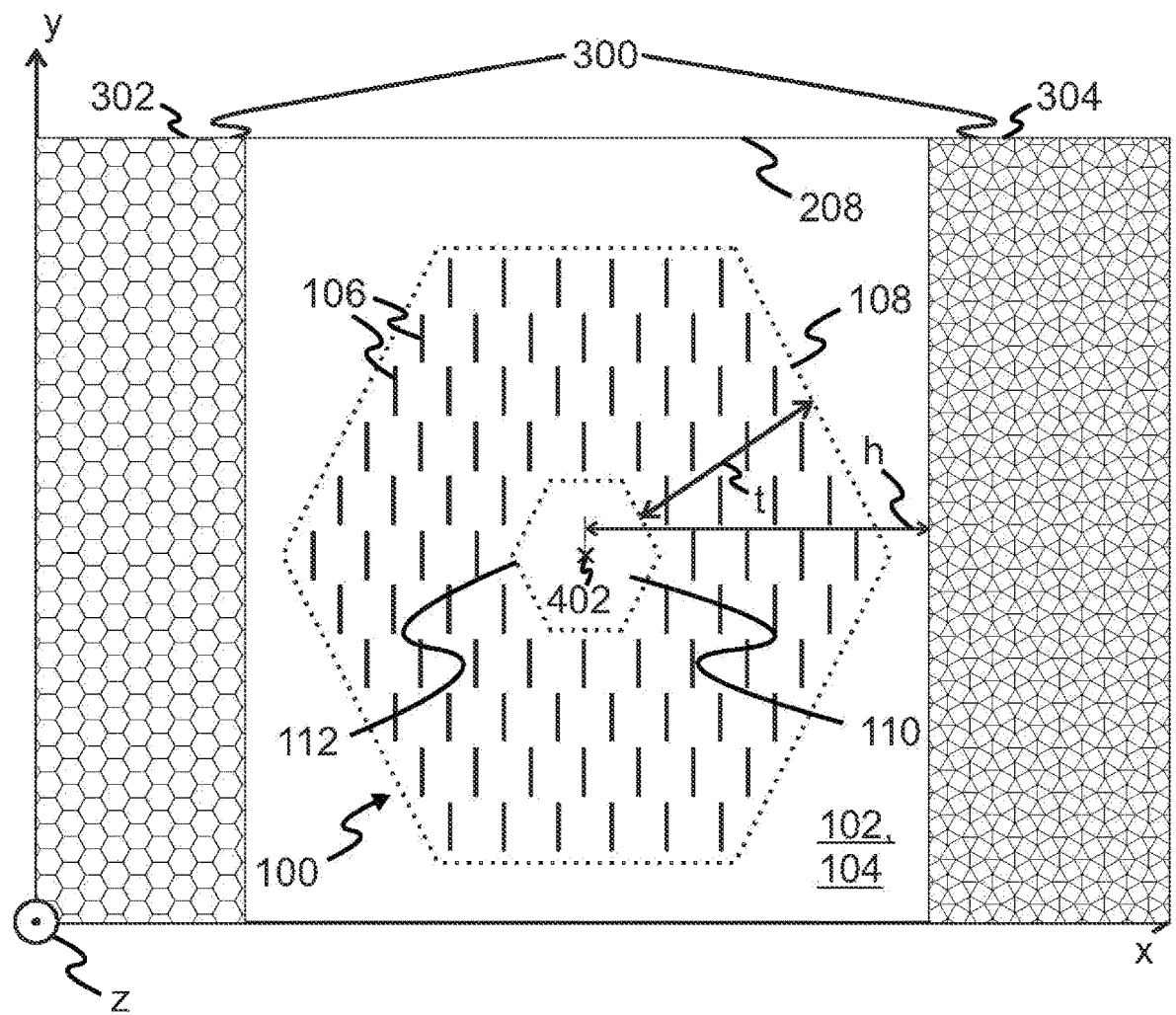
FIG. 11 is a diagram of a waveguide device according to another embodiment in accordance with the disclosure.
Figure 12:
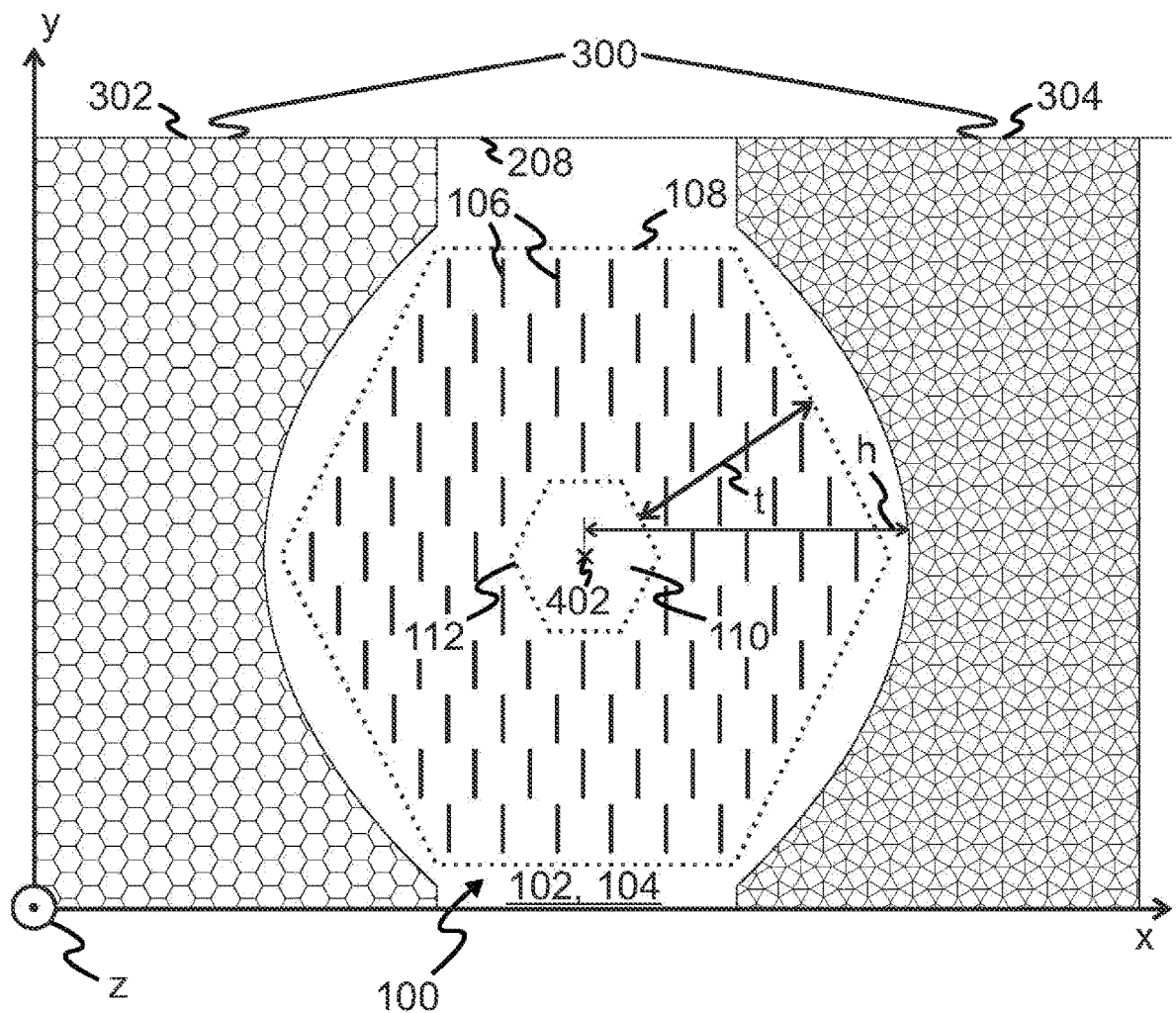
FIG. 12 is a diagram of a waveguide device according to yet another embodiment in accordance with the disclosure.

FIG. 11 and FIG. 12 depict waveguide devices according to alternative embodiments. The waveguide 100 of the embodiments depicted in FIG. 11 and FIG. 12 is similar to the waveguide described in the context of the embodiments of FIG. 1a, FIG. 1b, and FIG. 1c, and is fabricated using the apparatus and method described in the context of FIG. 2a to FIG. 2i and FIG. 3. Each of the waveguide devices also comprises a plurality 300 of electrodes 302, 304.

However, the waveguide devices according to the embodiments of FIG. 11 and FIG. 12 differ from each other and from the embodiments described above in the geometric arrangement of the electrodes 300, 302, 304. In particular, the electrode 302 and the counter electrode 304 of the embodiments of FIG. 11 and FIG. 12 are arranged at least partially below the surface 208. In other words, the surface 208 is located at a position along the direction y perpendicular to the surface 208, which is above at least a part of the electrode 302 and the electrode 304.

In the embodiment of FIG. 11, the electrode 302 and the counter electrode 304 are located on opposite sides of the waveguide 100. The electrodes 300, 302, 304 are essentially flat in a plane y, z parallel to the waveguide 100 and perpendicular to the surface 208. Such electrodes are fabricated by first forming the waveguide 100 in the electro-optical material 104 of the substrate 102 as described in the context of FIG. 2a to FIG. 2i and FIG. 3. Afterwards, an etching or laser cutting step is performed to selectively remove a section of the substrate 102 and produce a void structure with the shape of the electrodes 300, 302, 304 to be formed. The etching or laser cutting step may use a photolithographic etching step, in particular an anisotropic etching step, or a maskless laser cutting step or a combination of the two. Afterwards, the structured void is filled with a conductive material, such as titanium, tantalum, gold or copper or a combination thereof, deposited for example from the gas phase in a vacuum chamber.

The embodiment of FIG. 12 is similar to the embodiment of FIG. 11, yet with curved electrodes 300, 302, 304. The curved electrodes 300, 302, 304 further improve the overlap between the electric field induced by the control voltage applied between the electrode 302 and the counter electrode 304 and an electromagnetic wave propagating in the core 110. The curved electrodes 300, 302, 304 are produced using at least one photolithographic etching step, in particular using a combination of anisotropic and an isotropic etching steps, and/or a maskless laser cutting step. The more complex shape of the electrodes 300, 302, 304 of the embodiment of FIG. 12 as compared to the electrodes 300, 302, 304 described above may make the production of the waveguide device of FIG. 12 more challenging and expensive.

In general, in accordance with the first aspect of the disclosure, a A corresponding waveguide may provide a propagation loss as low as 0.15 dB/cm, or 0.45 dB for a waveguide with a length of 30 mm, respectively, corresponding to the length typically applied in an electro-optical modulator suitable to provide a π phase shifter. The low propagation loss is a consequence of the arrangement of the tracks of the waveguide and the method of track manufacturing. Together with the low refractive index of the tracks, the arrangement provides an embedded cladding for the waveguide. The waveguide geometry supports a low control voltage, which may be below 20 V according to embodiments. Particularly beneficial arrangements of the electrodes may further reduce the control voltage.

At least 30, in particular at least 40 or, in particular at least 50 or all of the equilateral triangles may form a lattice, wherein at least one corner of each equilateral triangle of the lattice coincides with a corner of another equilateral triangle of the lattice. Any triangle of the lattice may be interconnected with any other triangle of the lattice via triangles of the lattice, in particular, via sides of triangles of the lattice. The sides of the triangles of the lattice may connect corners of triangles of the lattice. The lattice may be hexagonal and/or form a section of a hexagonal lattice. In particular, at least two corners of each equilateral triangle of the lattice may each coincide with a corner of a different equilateral triangle of the lattice. In particular, all three corners of each equilateral triangle of the lattice may each coincide with a corner of a different equilateral triangle of the lattice.

Any pair of two different equilateral triangles may share at most one same track. Any pair of two different corners of equilateral triangles may share at most one same track. According to embodiments, when corners of a first equilateral triangle coincide with a first track, a second track, and a third track, no more than one corner of any other equilateral triangle coincides with the first track, the second track, or the third track.

The arrangement may comprise at least 50 or at least 60 of the equilateral triangles with the identical side lengths.

The identical side lengths may be at least 2 μm or at least 3 μm.

Alternatively, or in addition, the identical side lengths may be at most 8 μm, in particular at most 7 μm or at most 6 μm.

In an embodiment, each of the equilateral triangles share their orientation in space, in particular their orientation in the plane perpendicular to the direction of the waveguide.

According to an embodiment, each of the equilateral triangles in the arrangement may be construed as a shifted image of any other equilateral triangle in the arrangement, wherein the shift may be a translation in the plane perpendicular to the direction of the waveguide. The shifted image may be a non-rotated image that is translated linearly in the plane perpendicular to the direction of the waveguide.

The arrangement in the plane perpendicular to the direction of the waveguide may refer to centers of cross sections of the tracks in the plane perpendicular to the direction of the waveguide.

The arrangement may comprise an outer boundary of an essentially hexagonal shape.

The arrangement may comprise at least 30, in particular at least 35 or at least 40, tracks, preferably each located in a center of an equilateral hexagon formed by other tracks in the plane perpendicular to the direction of the waveguide, wherein each equilateral hexagon has the identical side length.

According to an embodiment, the waveguide device may have a translational symmetry along the direction of the waveguide.

According to an embodiment, a plurality of planes perpendicular to the direction of the waveguide, in particular all planes perpendicular to the direction of the waveguide, form an arrangement with some or all of the features described above or elaborated further below.

The tracks may form the arrangement in any plane perpendicular to the direction of the waveguide along a length of the waveguide device.

The electro-optical material may comprise or be a non-linear optical material and/or a crystalline material without inversion symmetry, such as $RbTiOPO_4$ or $KTiOPO_4$.

Such an electro-optical material may provide a high electro-optical coefficient, which may be beneficial for establishing an electro-optical modulator, such as a $\pi$ phase shifter, with a short optical path in the electro-optical material. The short optical path in the electro-optical material may reduce propagation losses and reduce a capacitance of the waveguide device, which may promote a high switching speed.

The waveguide may be adapted to operate as a single-mode waveguide. The waveguide may have an extension along at least one direction in the plane perpendicular to the direction of the waveguide smaller than 200 µm, in particular smaller than 100 µm or smaller than 50 µm. In particular, the extension of the waveguide may be smaller than 200 µm, in particular smaller than 100 µm or smaller than 50 µm along any direction in the plane perpendicular to the direction of the waveguide.

The first refractive index may be a refractive index of the electro-optical material for light with a polarization perpendicular to the direction of the waveguide. The first refractive index may be a refractive index of the electro-optical material for an electromagnetic wave with a telecommunication wavelength, such as an electromagnetic wave with a wavelength in vacuum of 1.55 µm or 1.3 µm.

Therefore, an electro-optical modulator applying the waveguide device may be adapted to work at a telecommunication wavelength, which is beneficial for communication applications.

The second refractive index may be smaller than the first refractive index by at least 0.3%, in particular by at least 0.4%, in particular by at least 0.5% or by at least 0.6%.

The second refractive index may be a refractive index of the tracks for an electromagnetic wave with the telecommunication wavelength.

The second refractive index may be a refractive index of the tracks for light with the polarization perpendicular to the direction of the waveguide.

Each track of the plurality of tracks may have an extension smaller than 5 µm, in particular smaller than 2 µm or smaller than 1 µm along at least one direction in the plane perpendicular to the direction of the waveguide. Each track of the plurality of tracks may have an extension of at least 5 µm, in particular of at least 6 µm or of at least than 7 µm along a second direction in the plane perpendicular to the direction of the waveguide, wherein the second direction in the plane perpendicular to the direction of the waveguide is perpendicular to the at least one direction in the plane perpendicular to the direction of the waveguide. Each track of the plurality of tracks may have an extension of at most 10 µm, in particular of at most 9 µm or of at least most 8 µm along the second direction in the plane perpendicular to the direction of the waveguide.

The plurality of tracks may form at least a section of an outer boundary of the waveguide.

The waveguide may comprise a first end, and the waveguide device may comprise a first optical fiber optically coupled to the first end of the waveguide. The waveguide may comprise a second end, and the waveguide device may comprise a second optical fiber optically coupled to the second end of the waveguide.

At least one electrode of the plurality of electrodes or all electrodes of the plurality of electrodes may comprise or be composed of a noble metal, such as copper or gold.

The waveguide may comprise a core. The core may be defined by a first interruption of the arrangement of the tracks comprising the equilateral triangles in the plane perpendicular to the direction of the waveguide.

A minimum distance between a center of the core and a nearest electrode of the plurality of electrodes may be at most 60 µm, in particular at most 40 µm, in particular at most 30 µm or at most 20 µm.

A shortest distance between the center of the core and the nearest electrode may reduce the control voltage required to establish an electro-optical modulator with the waveguide device, for example a phase shifter such as a $\pi$ phase shifter with the waveguide device. A reduced control voltages may improve a switching speed of the electro-optical modulator.

The first interruption may comprise the electro-optical material without the tracks.

The center of the core may refer to the center of the core in the plane perpendicular to the direction of the waveguide.

The nearest electrode may be the electrode of the plurality of electrodes with the smallest distance to the center of the core in the plane perpendicular to the direction of the waveguide.

The core may be enclosed by the arrangement in the plane perpendicular to the direction of the waveguide on at least two sides, in particular on at least three sides. The sides may correspond to directions, wherein angles between any two of the directions may be integer multiples of 90°.

The arrangement of the track enclosing the core may be suitable to confine an electromagnetic wave to the core and reduce propagation losses related to a leakage of the electromagnetic wave to regions with an increased dissipation, such as absorptive and/or metallic regions.

The core may have an outer boundary with an essentially hexagonal shape.

A cladding thickness may be a thickness of the arrangement of the tracks in the plane perpendicular to the direction of the waveguide. In particular, the cladding thickness may refer to a distance in the plane perpendicular to the direction of the waveguide from the core of the waveguide to an outer boundary of the arrangement of the tracks. The outer boundary of the arrangement of the tracks may be defined as a polygon comprising all tracks of the arrangement in the plane perpendicular to the direction of the waveguide, in particular as a polygon of a minimum size, such as a hexagon with a minimum size.

The cladding thickness may be asymmetric, such that a section of the arrangement of the tracks in the plane perpendicular to the direction of the waveguide with a minimum cladding thickness is arranged between the core and an electrode of the plurality of electrodes, in particular between the core and the nearest electrode. The minimum cladding thickness may correspond to one track. The section of the arrangement with the minimum cladding thickness may comprise or be an interruption of a hexagonal symmetry of the arrangement of the tracks.

The minimum thickness of the waveguide and/or of the arrangement of tracks between the core and the electrode may reduce the distance between the two. The reduced distance may promote a large electric field, and therefore an operation of the waveguide device, for example as a phase shifter such as a π phase shifter, with a moderate control voltage applied to the electrodes. The moderate control voltage may improve a switching speed of the waveguide device.

The minimum cladding thickness may be smaller than 30 µm, in particular smaller than 25 µm or smaller than 20 µm.

According to an embodiment, the minimum cladding thickness may be at least 10 µm, in particular at least 12 µm or at least 15 µm.

This thickness range may allow for a short distance between the waveguide and/or its core to the nearest electrode, while providing a sufficient confinement of an electromagnetic wave to the waveguide and/or its core to avoid losses related to a leakage of the electromagnetic wave towards the electrodes.

The minimum cladding thickness may be zero, and/or the arrangement of the tracks may be absent in the section of the arrangement with the minimum cladding thickness.

The arrangement of the tracks and the plurality of electrodes may together enclose the core in the plane perpendicular to the direction of the waveguide. In particular, the arrangement of the tracks and the nearest electrode may together enclose the core in the plane perpendicular to the direction of the waveguide. For example, any half-line in the plane perpendicular to the direction of the waveguide starting from the center of the core may intersect the arrangement of the tracks or an electrode of the plurality of electrodes, in particular the nearest electrode.

An absence of the waveguide cladding and/or the arrangement of the tracks in the section with the minimum thickness may further reduce the distance between the waveguide and/or its core to the nearest electrode, and thus a control voltage. However, propagation losses due to leakage of an electromagnetic wave from the waveguide and/or its core to the electrode(s) may be increased in such embodiments.

The at least one electrode of the plurality of electrodes may be arranged on a first surface, wherein the first surface may be a surface of the substrate and/or a surface of the electro-optical material.

Arranging the electrode on the surface of the substrate and/or of the electro-optical material may provide a device design which may be implemented readily and economically using available techniques.

Alternatively, at least one electrode of the plurality of electrodes may be at least partially embedded into the substrate and/or the electro-optical material. In such embodiments, the at least one electrode may be at least partially arranged below a first surface, wherein the first surface is a surface of the substrate and/or a surface of the electro-optical material.

A first electrode of the plurality of electrodes and a second electrode of the plurality of electrodes may be arranged on opposite sides of the waveguide.

At least a section of the first electrode, and/or at least a section of the second electrode may be concentric with an outer shape of the waveguide and/or with the core.

Embedding at least one electrode into the substrate and/or the electro-optical material may bring the electrode closer to the waveguide or its core, and may therefore reduce a control voltage further, yet possibly at the cost of a more complex and potentially more expensive fabrication of the electrodes.

A minimum distance between a center of the core and the first surface may be at most 60 µm, in particular at most 40 µm, in particular at most 30 µm, in particular at most 20 µm or at most 15 µm.

In embodiments with the section of the waveguide with the minimum thickness, the section of the waveguide with the minimum thickness may be arranged in part or completely between the core of the waveguide and the first surface.

The at least one electrode may have an extension along the direction of the waveguide of at least 10 mm, in particular at least 15 mm, at least 20 mm or at least 25 mm.

A corresponding extension may promote the application of the waveguide device as an electro-optical modulator, for example as a phase shifter such as a π phase shifter.

The at least one electrode may be in direct contact with the electro-optical material.

The direct contact may minimize the distance between the electrode and the waveguide and/or its core, and thereby the control voltage of an electro-optical modulator applying the waveguide device.

The at least one electrode may comprise the nearest electrode.

The plurality of electrodes may further comprise at least one counter electrode different from the at least one electrode, wherein the at least one counter electrode is arranged on the first surface.

Arranging also the counter electrode on the first surface may provide a device design which may be implemented readily and economically using known technologies.

The at least one counter electrode may be in direct contact with the electro-optical material.

The at least one counter electrode may have an extension along the direction of the waveguide of at least 10 mm, in particular at least 15 mm, at least 20 mm or at least 25 mm.

The at least one counter electrode may be arranged parallel to the at least one electrode.

In some embodiments, a minimum distance between the at least one counter electrode and the at least one electrode may not exceed 300 µm, in particular not exceed 150 µm, in particular not exceed 100 µm or 80 µm.

The at least one counter electrode may comprise at least two counter electrodes.

The at least two counter electrodes may be arranged on opposite sides of the at least one electrode on the first surface. Alternatively, or in addition, the at least two counter electrodes may be arranged symmetrically in a vicinity of the at least one electrode on the first surface, in particular with respect to a mirror plane intersecting the at least one electrode and/or the core of the waveguide.

The at least two counter electrodes may be arranged parallel to each other.

The at least two counter electrodes may be arranged parallel to the at least one electrode.

A minimum distance between any of the at least two counter electrodes and the at least one electrode may not exceed 300 µm, in particular not exceed 150 µm, in particular not exceed 100 µm or 80 µm.

The first surface may be planar. A surface of the at least one electrode and a surface of the at least one counter electrode may be coplanar with each other, and in particular also be coplanar with the first surface.

In accordance with the second aspect of the disclosure, an electro-optical modulator may be adapted to operate at a frequency of at least 1 GHz. The electro-optical modulator may be adapted to operate with a control voltage between the at least one electrode and the at least one counter electrode of at most 20 V. The electro-optical modulator may comprise a first lead connected to the at least one electrode and a second lead connected to the at least one counter electrode, wherein the first lead and the second lead may be adapted to connect the at least one electrode and the at least one counter electrode to a voltage source adapted to provide the control voltage.

The method of the present disclosure may provide a technique for laser-writing a waveguide with tracks of a reduced refractive index, also sometimes referred to as an embedded cladding waveguide. The embedded cladding waveguide may provide a low propagation loss. The arrangement of the tracks with the equilateral triangles may reduce the propagation loss even further.

The method may further comprise generating the laser beam using a laser. The laser may be a pulsed laser, in particular a pulsed laser providing a laser beam with a pulse duration below 1 ps, in particular below 0.5 ps. The laser may be an infrared laser, providing the laser beam, for example, with a wavelength of at most 11 µm, in particular at most 1100 nm.

A repetition rate of the pulsed laser may be at last 1 kHz. A repetition rate of the pulsed laser may be at most 200 kHz.

The propagating the focus of the laser beam may comprise translating the substrate, in particular while keeping a position of the laser fixed. The translating the substrate may use a translation stage, in particular an at least partially automatized translation stage. Alternatively, or in addition, the propagating the focus of the laser beam may comprise translating the position of the laser beam.

The waveguide device, the substrate, the electro-optical material, the plurality of tracks, and the arrangement in the plane perpendicular to the direction of the waveguide may be characterized by features corresponding to the ones described above in the context of the waveguide device.

A polarization of the laser beam may be linear and perpendicular to the direction of the waveguide.

The focus may refer to a plane perpendicular to a direction of the laser beam, in particular to a focal plane.

In the focus, a width of the laser beam may be minimal along at least one direction perpendicular to the direction of the laser beam.

The focusing the laser beam into the electro-optical material may comprise generating a longitudinal width of the laser beam in the focus along the direction of the waveguide and perpendicular to a direction of the laser beam, and generating a transverse width of the laser beam in the focus perpendicular to the direction of the waveguide and perpendicular to the direction of the laser beam, wherein the longitudinal width is larger than the transverse width.

The longitudinal width and the transverse width may each refer to a width of the laser beam perpendicular to the direction of the laser beam.

The longitudinal width and the transverse width may each refer to a width of the laser beam in the focus, in particular in a focal plane perpendicular to the direction of the laser beam.

The longitudinal width may refer to a width of the laser beam along the direction of the waveguide. The transverse width may refer to a width of the laser beam perpendicular to the direction of the waveguide. The laser beam may have a non-circular or asymmetric cross section in the focus.

In particular, the laser beam may have an elliptical cross section in the focus. A long axis of the elliptical cross section may be parallel to the direction of the waveguide. A short axis of the elliptical cross section may be perpendicular to the direction of the waveguide.

The non-circular or asymmetric cross section of the laser beam in the focus may result in a reduced roughness of the formed tracks, and in a further reduction of the propagation loss of the waveguide.

The longitudinal width and/or the transverse width may each refer to an extension of the laser beam in the focus and perpendicular to the direction of the laser beam.

The method may further comprise, prior to the focusing, providing the laser beam as an essentially parallel beam with a first extension along the direction of the waveguide and a second extension along a direction perpendicular to both the direction of the waveguide and the direction of the laser beam, wherein the second extension exceeds the first extension.

The essentially parallel beam with the first extension and the second extension may readily be transformed into a laser beam in the focus with the longitudinal width exceeding the transverse width by focusing.

Alternatively, or in addition, the method may comprise introducing an anisotropic focusing element, such as a cylindrical lens or mirror and/or an ellipsoidal lens or mirror and/or a tilted lens, into the laser beam to generate the longitudinal width larger than the transverse width. In such embodiments, the method may comprise generating a second focus in addition to the focus.

In such embodiments, the laser beam may have a second longitudinal width in the second focus along the direction of the waveguide, and a second transverse width in the second focus along a direction perpendicular to both the direction of the waveguide and the direction of the laser beam, wherein the second transverse width is larger than the second longitudinal width.

The method may further comprise, prior to the providing the laser beam as an essentially parallel beam with the first extension and the second extension, providing the laser beam as an essentially parallel beam with an essentially circular cross-section; and shaping the essentially parallel beam with the essentially circular cross-section into the essentially parallel beam with the first extension and the second extension.

The essentially parallel beam may comprise a cross section essentially corresponding to an ellipse. The first extension may correspond to a short axis of the ellipse, and the second extension may correspond to a long axis of the ellipse.

The shaping the essentially parallel beam with the essentially circular cross-section into the essentially parallel beam with the first extension and the second extension may comprise introducing a collimator, such as a slit, to the essentially parallel beam. The collimator may be introduced to the essentially parallel beam along one direction perpendicular to a direction of the essentially parallel beam.

The collimator, such as the slit, may have a width of at least 0.2 mm. The collimator, such as the slit, may have a width of at most 1.5 mm.

The method may further comprise forming a plurality of electrodes in a vicinity of the waveguide.

The plurality of electrodes may be characterized by features corresponding to the ones described above in the context of the waveguide device.

The focusing the laser beam into the electro-optical material may comprise transmitting the laser beam through a first surface, wherein the first surface is a surface of the substrate and/or a surface of the electro-optical material.

The forming the plurality of electrodes may further comprise forming at least one electrode of the plurality of electrodes on the first surface.

The first surface may be characterized by features corresponding to the ones described above in the context of the waveguide device.

The forming the plurality of the tracks of the waveguide may comprise forming a track of the plurality of tracks located further away from the first surface prior to a track of the plurality of tracks located closer to the first surface.

In particular, for any pair of tracks of the plurality of tracks with different distances from the first surface, the forming the plurality of the tracks of the waveguide may comprise forming the track of the pair with the larger distance from the first surface prior to the track of the pair with the smaller distance from the first surface.

The forming the plurality of the tracks of the waveguide may comprise forming a track of the plurality of tracks located closer to a center of the waveguide in a plane parallel to the first surface prior to a track of the plurality of tracks located further away from the center of the waveguide in the plane parallel to the first surface.

In particular, for any pair of tracks of the plurality with different distances from the center of the waveguide in the plane parallel to the first surface, the forming the plurality of the tracks of the waveguide may comprise forming the track of the pair with the smaller distance from the center of the waveguide in the plane parallel to the first surface prior to the track of the pair with the larger distance from the center of the waveguide in the plane parallel to the first surface.

The forming the plurality of electrodes may further comprise forming at least one counter electrode of the plurality of electrodes on the first surface, wherein the at least one counter electrode is different from the at least one electrode.

The at least one counter electrode may be characterized by features corresponding to the ones described above in the context of the waveguide device.

The description and the figures merely serve to illustrate the disclosure and the numerous advantages associated therewith, but should not be construed to imply any limitation. The scope of the disclosure is to be determined from the appended claims.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A waveguide device, comprising:
   a substrate comprising an electro-optical material with a first refractive index;
   a waveguide formed in the electro-optical material, the waveguide comprising a plurality of tracks; and
   a plurality of electrodes formed in a vicinity of the waveguide;
   wherein the tracks comprise a second refractive index smaller than the first refractive index, are parallel to each other with a common direction defining a direction of the waveguide, and form an arrangement in a plane perpendicular to the direction of the waveguide; and
   wherein the arrangement comprises at least 40 equilateral triangles of identical side lengths, wherein all three corners of each of the equilateral triangles each coincide with a different track of the plurality of tracks in the plane perpendicular to the direction of the waveguide.

2. The waveguide device according to claim 1, wherein the waveguide comprises a core, wherein the core is defined by a first interruption of the arrangement of the tracks comprising the equilateral triangles in the plane perpendicular to the direction of the waveguide, and wherein a minimum distance between a center of the core and a nearest electrode of the plurality of electrodes is at most between 20 and 60 µm.

3. The waveguide device according to claim 2, wherein the waveguide comprises an asymmetric cladding thickness, such that a section of the waveguide with a minimum thickness is arranged between the core and an electrode of the plurality of electrodes.

4. The waveguide device according to claim 3, wherein the section of the waveguide with the minimum thickness is arranged between the core and a nearest electrode.

5. The waveguide device according to claim 4, wherein the electrode comprises the nearest electrode.

6. The waveguide device according to claim 4, wherein the plurality of electrodes further comprises at least one counter electrode different from the electrode, and wherein the at least one counter electrode is arranged on the first surface.

7. The waveguide device according to claim 3, wherein the electrode of the plurality of electrodes is arranged on a first surface, and wherein the first surface is a surface of the substrate and/or a surface of the electro-optical material.

8. The waveguide device according to claim 3, wherein the electrode is in direct contact with the electro-optical material.

9. An electro-optical modulator comprising a waveguide device according to claim 1, wherein the electro-optical modulator is a phase shifter.

10. The electro-optical modulator according to claim 9, wherein the phase shifter is a 7C phase shifter.

11. A method for fabricating a waveguide device, the method comprising:
providing a substrate comprising an electro-optical material with a first refractive index; and
forming a waveguide in the electro-optical material, wherein forming the waveguide comprises:
forming a plurality of tracks of the waveguide such that the tracks are parallel to each other with a common direction defining a direction of the waveguide such that the tracks comprise an arrangement in a plane perpendicular to the direction of the waveguide, wherein the arrangement comprises at least 40 equilateral triangles of identical side lengths, wherein each of three corners of each of the equilateral triangles coincides with a different track of the plurality of tracks in the plane perpendicular to the direction (z) of the waveguide;
wherein the forming of each track of the plurality of tracks comprises:
focusing a laser beam into the electro-optical material to reduce a refractive index in a focus of the laser beam from the first refractive index to a second refractive index smaller than the first refractive index; and
propagating the focus of the laser beam along the direction of the waveguide to form the track with the second refractive index in the electro-optical material.

12. The method according to claim 11, wherein the focusing the laser beam into the electro-optical material comprises generating a longitudinal width (w1) of the laser beam in a focus along the direction of the waveguide and perpendicular to a direction of the laser beam, and generating a transverse width of the laser beam in the focus perpendicular to the direction of the waveguide and perpendicular to the direction of the laser beam, wherein the longitudinal width is larger than the transverse width.

13. The method according to claim 11, further comprising, prior to the focusing, providing the laser beam as an essentially parallel beam with a first extension along the direction of the waveguide and a second extension along a direction perpendicular to both the direction of the waveguide and the direction of the laser beam, wherein the second extension exceeds the first extension.

14. The method according to claim 13, further comprising, prior to the providing the laser beam as an essentially parallel beam with the first extension and the second extension, providing the laser beam as an essentially parallel beam with an essentially circular cross-section; and shaping the essentially parallel beam with the essentially circular cross-section into the essentially parallel beam with the first extension and the second extension.

15. The method according to claim 11, further comprising forming a plurality of electrodes in a vicinity of the waveguide.

16. The method according to claim 15, wherein the focusing the laser beam into the electro-optical material comprises transmitting the laser beam through a first surface, wherein the first surface is a surface of the substrate and/or a surface of the electro-optical material, and wherein the forming the plurality of electrodes further comprises forming at least one electrode of the plurality of electrodes on the first surface.

17. The method according to claim 16, wherein the forming the plurality of electrodes further comprises forming at least one counter electrode of the plurality of electrodes on the first surface, wherein the at least one counter electrode is different from the at least one electrode.

* * * * *